US009280744B2

United States Patent
Raghunathan et al.

(10) Patent No.: US 9,280,744 B2
(45) Date of Patent: Mar. 8, 2016

(54) SYSTEM AND METHOD FOR OPTIMAL POWER FLOW ANALYSIS

(71) Applicant: Mitsubishi Electric Research Laboratories, Inc., Cambridge, MA (US)

(72) Inventors: Arvind U Raghunathan, Brookline, MA (US); Daniel Nikolaev Nikovski, Brookline, MA (US); Ajit Gopalakrishnan, Newark, DE (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 227 days.

(21) Appl. No.: 14/154,317

(22) Filed: Jan. 14, 2014

(65) Prior Publication Data

US 2015/0199606 A1 Jul. 16, 2015

(51) Int. Cl.
G06N 5/04 (2006.01)
G06Q 50/06 (2012.01)
G06F 17/11 (2006.01)
H02J 3/06 (2006.01)

(52) U.S. Cl.
CPC .... *G06N 5/04* (2013.01); *G06F 17/11* (2013.01); *G06Q 50/06* (2013.01); *H02J 3/06* (2013.01)

(58) Field of Classification Search
None
See application file for complete search history.

(56) References Cited

U.S. PATENT DOCUMENTS

| 6,625,520 B1 | 9/2003 | Chen et al. |
| 2012/0150504 A1 | 6/2012 | Akrotirianakis et al. |
| 2013/0018517 A1 | 1/2013 | Kalagnanam et al. |

FOREIGN PATENT DOCUMENTS

EP 2773005 A2 9/2014

OTHER PUBLICATIONS

Zhang, Optimal Sizing and Location of Static and Dynamic Reactive Power Compensation, Doctoral Thesis, The University of Tennessee, 2007, pp. 1-203.*
Gopalakrishnan A et al: "Global optimization of multi-period optimal power flow", 2013 American Control Conference (ACC), Jun. 17-19, 2013, Washington, DC, USA, Jun. 17, 2013 'pp. 1157-1164' XP032475910, ISSN: 0743-1619 ISBN: 978-1-4799-0177-7 [retrieved on Aug. 14, 2013] abstract sections I I and II.A section I I I ; figure 1.

(Continued)

*Primary Examiner* — Wilbert L Starks
(74) *Attorney, Agent, or Firm* — Dirk Brinkman; Gene Vinokur

(57) ABSTRACT

A method determines a power flow of a power grid by optimizing an objective function representing an operation of the power grid using a spatial branch and bound (BB) framework for determining iteratively upper and lower bounds of the objective function. During the optimization, the lower bounds are determined using a semi-definite programming (SDP) relaxation of an optimal power flow (OPF) problem.

14 Claims, 26 Drawing Sheets

(56) References Cited

OTHER PUBLICATIONS

Gopalakrishnan A et al: "Global optimization of Optimal Power Flow using a branch & bound algorithm", 2812 58th Annual Allerton Conference on Communication, Control, and Computing, Oct. 1-5, 2812, Allerton House, UIUC, Illinois, USA, Oct. 1, 2812 (2812-18-81), pp. 689-616, XP832345853, DOI: 18.1189/ALLERTON.2812. 6483274 ISBN: 978-1-4673-4537-8 abstract section I.B, paragraph 1 sections II and II.B sections III and III.B; figure 1, 2.

Panciati Ci P et al: "Advanced optimization methods for power systems", 2814 Power Systems Computation Conference, Aug. 18-22, 2814, Aug. 18, 2814 (2814-88-18), pp. 1-18, XP855199994, DOI: 18.1189/PSCC.2814.7838584 ISBN: 978-8-39-358813-2 section II section III.A, paragraph 1.

\* cited by examiner

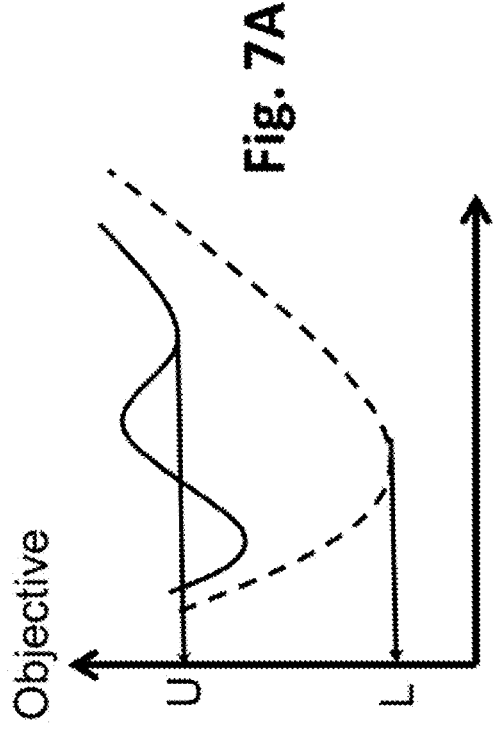
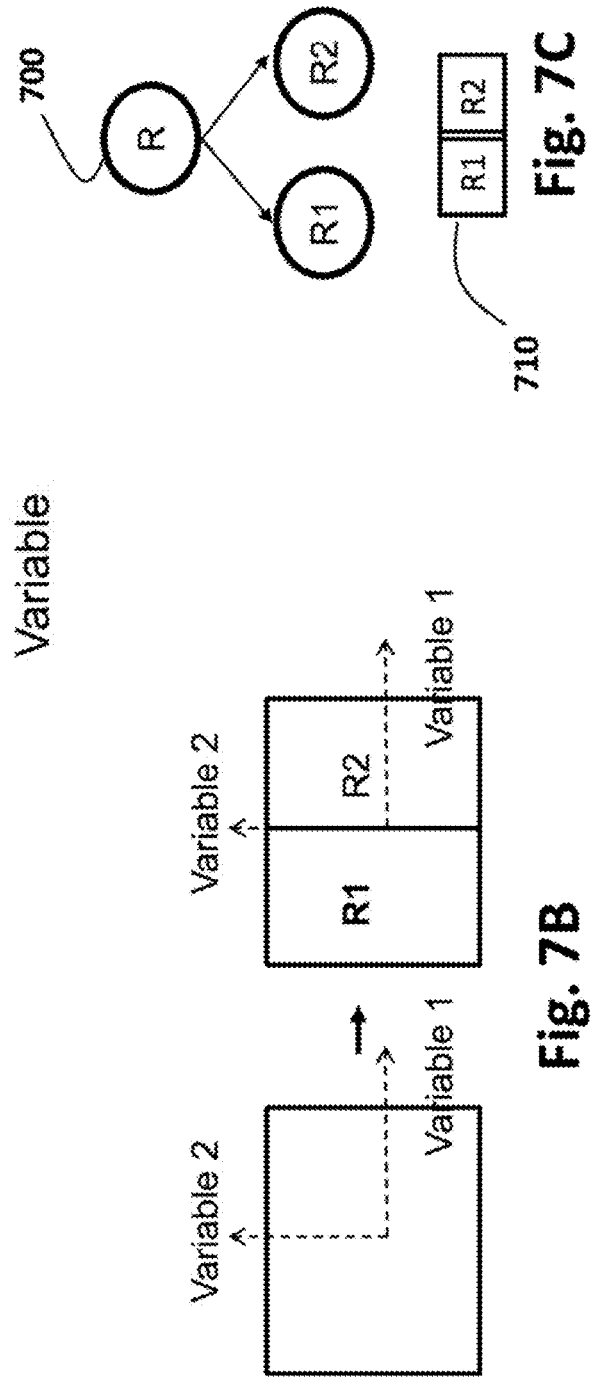

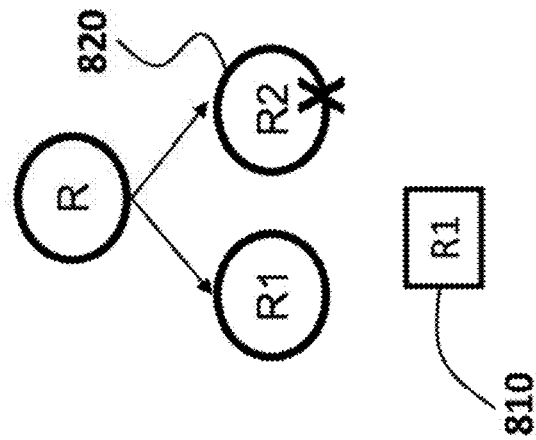
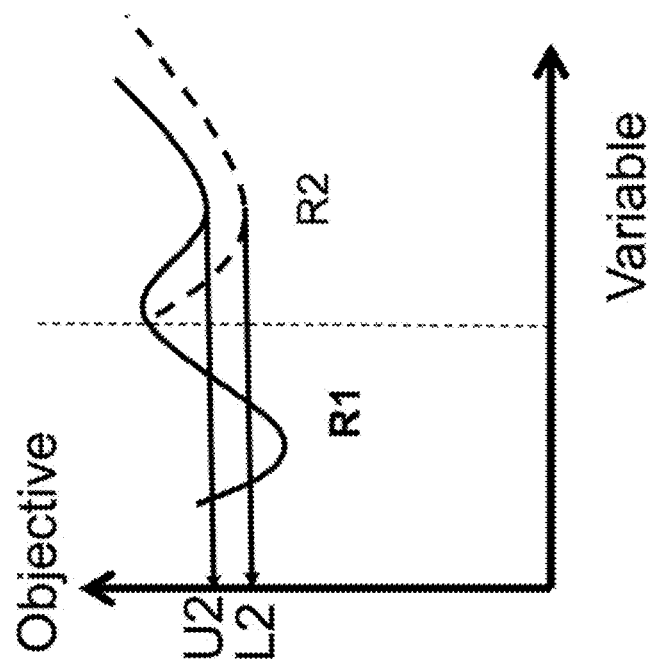
Fig. 8B
Fig. 8A

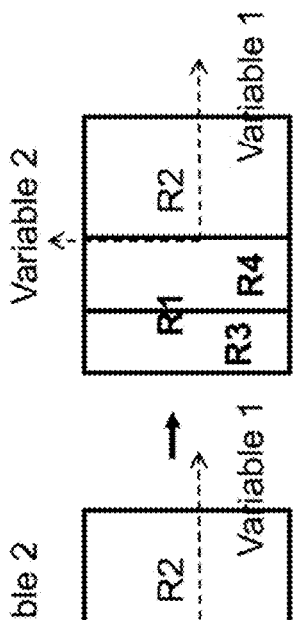
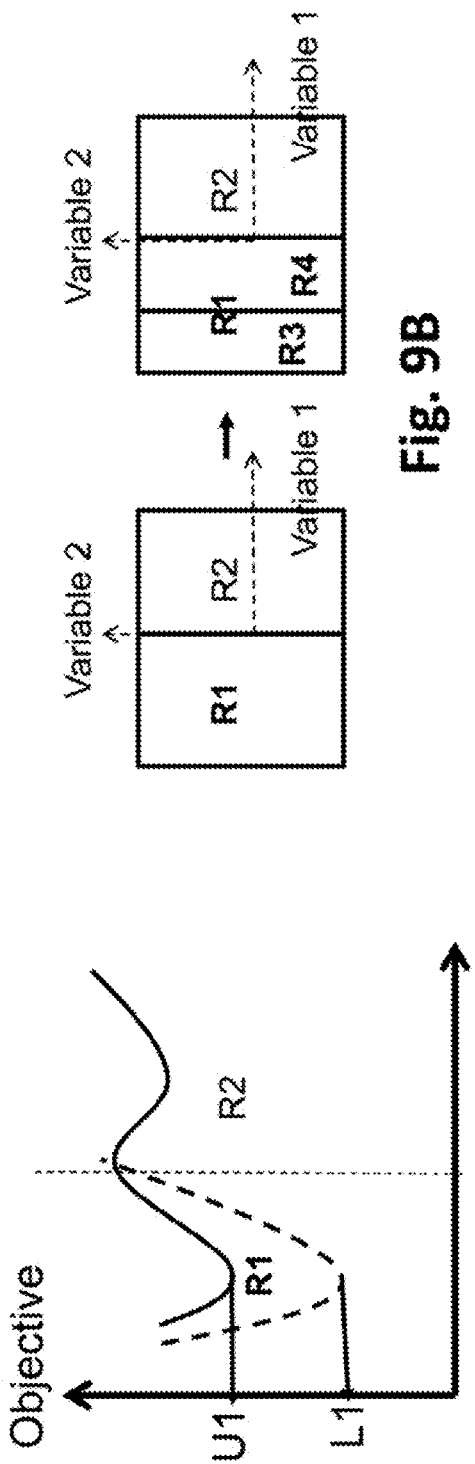
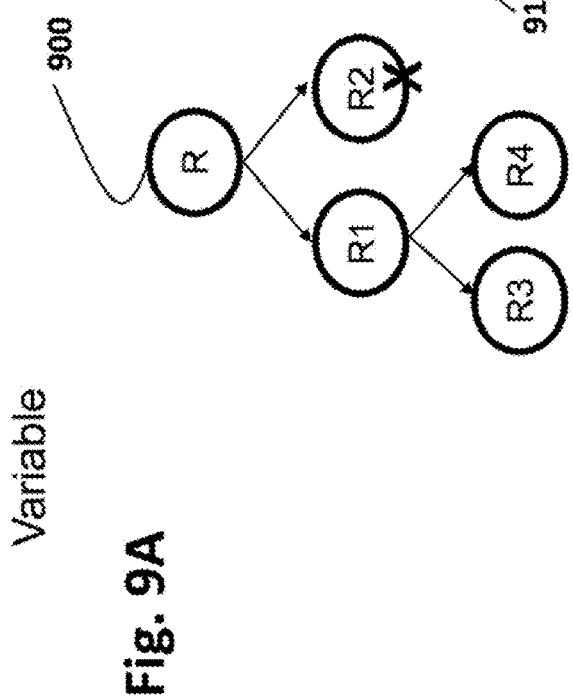
Fig. 9A
Fig. 9B
Fig. 9C

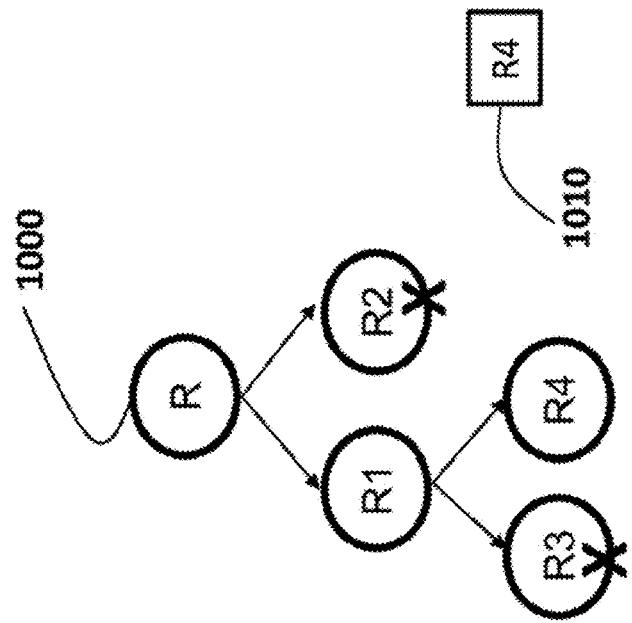
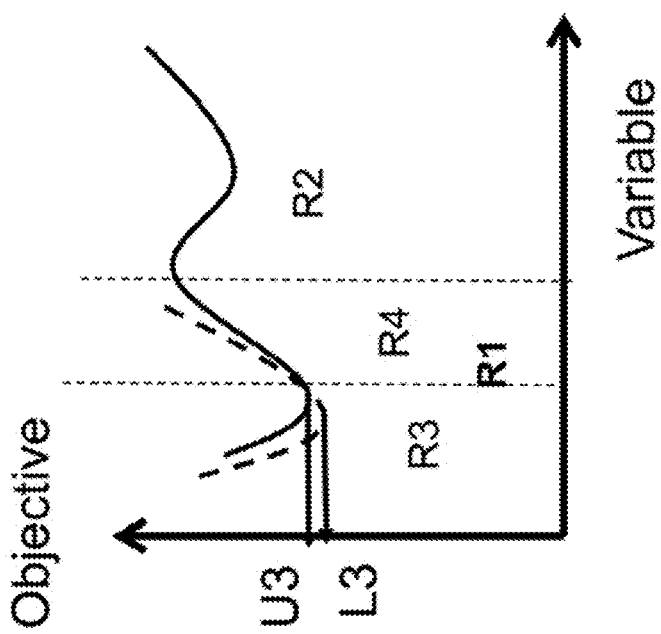
Fig. 10B
Fig. 10A

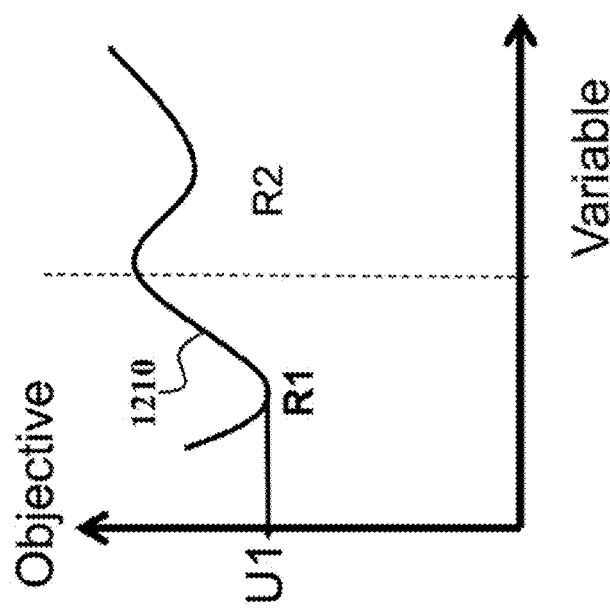
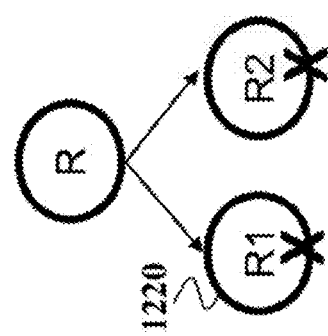
Fig. 12A
Fig. 12B

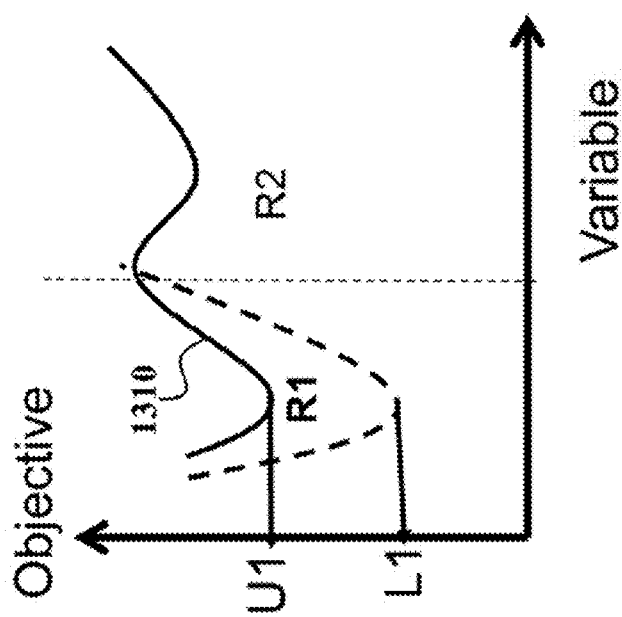
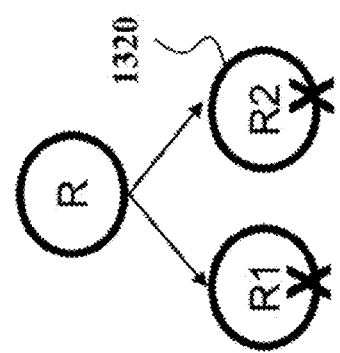
Fig. 13A
Fig. 13B $Y_{bus}$ is a $|N| \times |N|$ matrix with elements defined as $$Y_{bus}(i,j) = \begin{cases} -y_{ij} & \text{if } (i,j) \in E \\ -y_{ji} & \text{if } (j,i) \in E \\ \sum_{(i,k) \in E} y_{ik} + \sum_{(j,i) \in E} y_{ji} \end{cases}$$

$Y_{bus,i} = \zeta_i \zeta_i^T Y_{bus}; Y_{bus,ij} = y_{ij}\zeta_i\zeta_i^T - y_{ij}\zeta_i\zeta_j^T$ $Y_i = \frac{1}{2}\begin{bmatrix} \text{Re}(Y_{bus,i} + Y_{bus,i}^T) & \text{Im}(Y_{bus,i}^T - Y_{bus,i}) \\ \text{Im}(Y_{bus,i}^T - Y_{bus,i}^T) & \text{Re}(Y_{bus,i} + Y_{bus,i}^T) \end{bmatrix}; \overline{Y}_i = -\frac{1}{2}\begin{bmatrix} \text{Im}(Y_{bus,i} + Y_{bus,i}^T) & \text{Re}(Y_{bus,i} - Y_{bus,i}^T) \\ \text{Re}(Y_{bus,i}^T - Y_{bus,i}^T) & \text{Im}(Y_{bus,i} + Y_{bus,i}^T) \end{bmatrix}$ $Y_{ij} = \frac{1}{2}\begin{bmatrix} \text{Re}(Y_{bus,ij} + Y_{bus,ij}^T) & \text{Im}(Y_{bus,ij}^T - Y_{bus,ij}) \\ \text{Im}(Y_{bus,ij}^T - Y_{bus,ij}^T) & \text{Re}(Y_{bus,ij} + Y_{bus,ij}^T) \end{bmatrix}; \overline{Y}_{ij} = -\frac{1}{2}\begin{bmatrix} \text{Im}(Y_{bus,ij} + Y_{bus,ij}^T) & \text{Re}(Y_{bus,ij} - Y_{bus,ij}^T) \\ \text{Re}(Y_{bus,ij}^T - Y_{bus,ij}^T) & \text{Im}(Y_{bus,ij} + Y_{bus,ij}^T) \end{bmatrix}$ where $\zeta_i$ denotes a vector of size $|N|$ with a 1 at the $i$-th component and zeros elsewhere.

FIG. 14

$$w^H = (P_{i \in N}^G(t), Q_{i \in N}^G(t), B_{i \in N}(t), \hat{P}_{i \in N}^G(t+1), \hat{Q}_{i \in N}^G(t+1), \hat{B}_{i \in N}(t+1));$$

$$w^{g,lb} = (P_{i \in N}^{G,\min}, Q_{i \in N}^{G,\min}, B_{i \in N}^{\min}, P_{i \in N}^{L,\min}, Q_{i \in N}^{L,\min}, B_{i \in N}^{\min});$$

$$w^{g,ub} = (P_{i \in N}^{G,\max}, Q_{i \in N}^{G,\max}, B_{i \in N}^{\max}, P_{i \in N}^{L,\max}, Q_{i \in N}^{L,\max}, B_{i \in N}^{\max})$$

$$w^f = (P_{ij(i,j) \in \mathcal{E}}(t), P_{ji(i,j) \in \mathcal{E}}(t), Q_{ij(i,j) \in \mathcal{E}}(t), Q_{ji(i,j) \in \mathcal{E}}(t), R_{i \in N}(t), S_{i(i,j) \in \mathcal{E}}^{thmax}(t), S_{i(i,j) \in \mathcal{E}}^{P,ramp}, S_{i(i,j) \in \mathcal{E}}^{Q,ramp}),$$

$$w^{f,lb} = (P_{ij(i,j) \in \mathcal{E}}^{\min}(t), P_{ji(i,j) \in \mathcal{E}}^{\min}(t), Q_{ij(i,j) \in \mathcal{E}}^{\min}(t), Q_{ji(i,j) \in \mathcal{E}}^{\min}(t), R_{i \in N}^{\min}(t), Q_{ij(i,j) \in \mathcal{E}}(t), V_{i \in N}^{\min}(t), \Delta P_{i(i,j) \in \mathcal{E}}^{\min}, \Delta Q_{i(i,j) \in \mathcal{E}}^{\min})$$

$$w^{f,ub} = (P_{ij(i,j) \in \mathcal{E}}^{\max}(t), P_{ji(i,j) \in \mathcal{E}}^{\max}(t), Q_{ij(i,j) \in \mathcal{E}}^{\max}(t), Q_{ji(i,j) \in \mathcal{E}}^{\max}(t), R_{i \in N}^{\max}(t), L_{ij(i,j) \in \mathcal{E}}^{\max}(t), V_{i \in N}^{\max}(t), \Delta P_{i(i,j) \in \mathcal{E}}^{\max}, \Delta Q_{i(i,j) \in \mathcal{E}}^{\max})$$

$$\frac{1}{2}(w^g)^T H^g w^g = \sum_{i \in N} c_{2i}(P_i^G(t))^2 + \frac{\rho}{2}(\hat{P}_i^G(t+1))^2 + \frac{\rho}{2}(\hat{Q}_i^G(t+1))^2 + \frac{\rho}{2}(\hat{B}_i(t+1))^2$$

$$(b_i^g)^T w^g = \sum_{i \in N} c_{1i} P_i^G(t) + \rho \left( -\overline{B}_i(t+1) + \frac{v_{L_i}(t+1)}{\rho} \right) \hat{B}_i(t+1) + \rho \left( -\overline{P}_i^G(t+1) + \frac{v_{L_i}(t+1)}{\rho} \right) \hat{P}_i^G(t+1) + \rho \left( -\overline{Q}_i^G(t+1) + \frac{\sigma_{L_i}(t+1)}{\rho} \right) \hat{Q}_i^G(t+1)$$

FIG. 18

$$\Delta y^f = y^H \Delta y^H + y^f \Delta y^f = \begin{cases}
\hat{Q}_G^C(t+1) - Q_G^C(t+1) & \forall i \in N \\
\hat{P}_G^C(t+1) - P_G^C(t+1) & \forall i \in N \\
\hat{B}(t+1) - B(t+1) & \forall i \in N \\
r_{tk}(t) - \Delta V(t) & \forall i \in N \\
s_i^2(t) + (V_i(t))^2 & \forall i \in N \\
-W_{(N+i)(N+i)}(t) + W_{ii}(t) & \forall (i,j) \in E \\
f_{ij}(t) + p_{ij}(t) - s_{ij}^{forward} & \forall (i,j) \in E \\
\bar{Q}_{ij}(t) - \bar{Q}_{ij}^G(t) + T_R(t)\Delta Q_{ij}(t) & \forall i \in N \\
-(\bar{Q}_{ij}(t) - \bar{Q}_{ij}^G(t)) & \forall (i,j) \in E \\
-(P_{ij}(t) - P_{ij}^G(t)) + T_R(t)\Delta P_{ij}(t) & \forall (i,j) \in E \\
-Q_{ij}(t) + T_R(t)\Delta Q_{ij}(t)M_{ij}^Q(t) & \forall (i,j) \in E \\
-P_{ji}(t) + T_R(t)\Delta P_{ji}(t)M_{ji}^P(t) & \forall (i,j) \in E \\
-P_{ij}(t) + T_R(t)\Delta P_{ij}(t)M_{ij}^P(t) & \forall (i,j) \in E
\end{cases}$$

FIG. 19

$$w^g = (P^G_{i \in N}(t), Q^G_{i \in N}(t), B_{i \in N}(t), \hat{P}^G_{i \in N}(t+1), \hat{Q}^G_{i \in N}(t+1), \hat{B}_{i \in N}(t+1));$$

$$w^{g,lb} = (P^{G,min}_{i \in N}, Q^{G,min}_{i \in N}, B^{min}_{i \in N}, P^{G,min}_{i \in N}, Q^{G,min}_{i \in N}, B^{min}_{i \in N});$$

$$w^{g,ub} = (P^{G,max}_{i \in N}, Q^{G,max}_{i \in N}, B^{max}_{i \in N}, P^{G,max}_{i \in N}, Q^{G,max}_{i \in N}, B^{max}_{i \in N});$$

$$w^f = (P_{ij(i,j) \in E}(t), P_{ji(i,j) \in E}(t), Q_{ij(i,j) \in E}(t), Q_{ji(i,j) \in E}(t), R_{i \in N}(t), S^{furnless}_{ij(i,j) \in E}(t), S^V_{i \in N}(t), S^{PGramp}_{ij \in N}(t), S^{QGramp}_{i \in N});$$

$$w^{f,lb} = (P^{min}_{ij(i,j) \in E}(t), P^{min}_{ji(i,j) \in E}(t), Q^{min}_{ij(i,j) \in E}(t), Q^{min}_{ji(i,j) \in E}(t), R^{min}_{i \in N}(t), \theta_{ij(i,j) \in E}(t), V^{min}_{i \in N}(t), \Delta P^{min}_{i \in N}, \Delta Q^{min}_{i \in N});$$

$$w^{f,ub} = (P^{max}_{ij(i,j) \in E}(t), P^{max}_{ji(i,j) \in E}(t), Q^{max}_{ij(i,j) \in E}(t), Q^{max}_{ji(i,j) \in E}(t), R^{max}_{i \in N}(t), L^{max}_{ij(i,j) \in E}(t), V^{max}_{i \in N}(t), \Delta P^{max}_{i \in N}, \Delta Q^{max}_{i \in N})$$

$$\frac{1}{2}(w^g)^T H^g w^g = \sum_{i \in N} c_{2,i} (P^G_i(t))^2 + \frac{\rho}{2}(P^G_i(t))^2 + \frac{\rho}{2}(Q^G_i(t))^2 + \frac{\rho}{2}(B_i(t))^2 + \frac{\rho}{2}(\hat{P}^G_i(t+1))^2 + \frac{\rho}{2}(\hat{Q}^G_i(t+1))^2 + \frac{\rho}{2}(\hat{B}_i(t+1))^2$$

$$(h^g_i)^T w^g = \sum_{i \in N} c_{1,i} P^G_i(t) + \left(-\bar{B}_i(t+1) + \frac{\tau_{i,3}(t+1)}{\rho}\right) \hat{B}_i(t+1) + \rho\left(-\bar{P}^G_i(t+1) + \frac{v_{i,1}(t+1)}{\rho}\right) \hat{P}^G_i(t+1) + \rho\left(-\bar{Q}^G_i(t+1) + \frac{v_{i,2}(t+1)}{\rho}\right) \hat{Q}^G_i(t+1) +$$

$$\left(-\bar{B}_i(t) + \frac{\tau_{i,3}(t)}{\rho}\right) B_i(t) + \rho\left(-\bar{P}^G_i(t) + \frac{v_{i,1}(t)}{\rho}\right) P^G_i(t) + \rho\left(-\bar{Q}^G_i(t) + \frac{v_{i,2}(t)}{\rho}\right) Q^G_i(t)$$

FIG. 20

$$\nabla_{ij}^f = \nabla_{ij}^B + \nabla_{ij}^W = \begin{cases}
\hat{Q}_i^G(t+1) - Q_i^G(t+1) & \forall i \in N \\
\hat{P}_i^G(t+1) - P_i^G(t+1) & \forall i \in N \\
\hat{B}_i(t+1) - B_i(t+1) & \forall i \in N \\
P_{Vi}(t) \cdot W_{Vi}(t) - W_{Vi}(t+1) & \forall i \in N \\
p_{(V_i(t)+V_{Vi}(t+1))}^B \cdot W_i(t+1) & \forall i \in N \\
p_{Messages}^{fij} \cdot S_{fij}(t) & \forall (i,j) \in E \\
P_i^B(t) + P_i^D(t) & \forall i \in N \\
-\bar{Q}_i^G(t) - \bar{Q}_i^D(t) & \forall i \in N \\
-(P_i^G(t) - P_i^D(t)) & \forall i \in N \\
-Q_{ij}^R(t) + T_R(Y_{ij}) M_{ij}^R(t) & \forall (i,j) \in E \\
-\bar{Q}_{ij}(t) + T_I(Y_{ij}) \bar{M}_{ij}(t) & \forall (i,j) \in E \\
-P_{ij}(t) + T_R(Y_{ij}) M_{ij}(t) & \forall (i,j) \in E \\
-P_{ij}(t) + T_I(Y_{ij}) M_{ij}(t) & \forall (i,j) \in E
\end{cases}$$

FIG. 21

$$w_i^g = (P_{i\in N}^G(t), Q_{i\in N}^G(t), B_{i\in N}(t), P_{i\in N}^G(t+1), \hat{Q}_{i\in N}^G(t+1), \hat{B}_{i\in N}(t+1));$$

$$w^{g,lb} = (P_{i\in N}^{G,\min}, Q_{i\in N}^{G,\min}, B_{i\in N}^{\min}, P_{i\in N}^{G,\min}, Q_{i\in N}^{G,\min}, B_{i\in N}^{\min});$$

$$w^{g,ub} = (P_{i\in N}^{G,\max}, Q_{i\in N}^{G,\max}, B_{i\in N}^{\max}, P_{i\in N}^{G,\max}, Q_{i\in N}^{G,\max}, B_{i\in N}^{\max})$$

$$w^l = (P_{ij(i,j)\in E}(t), P_{jk(k,j)\in E}(t), Q_{ij(i,j)\in E}(t), Q_{jk(k,j)\in E}(t), R_{i\in N}(t), s_{ij(i,j)\in E}^{lossless}(t), s_{i,i\in N}^V(t))$$

$$w^{l,lb} = (P_{ij(i,j)\in E}^{\min}, P_{jk(k,j)\in E}^{\min}, Q_{ij(i,j)\in E}^{\min}, Q_{jk(k,j)\in E}^{\min}, R_{i\in N}^{\min}, 0_{ij(i,j)\in E}, V_{i\in N}^{\min})$$

$$w^{l,ub} = (P_{ij(i,j)\in E}^{\max}, P_{jk(k,j)\in E}^{\max}, Q_{ij(i,j)\in E}^{\max}, Q_{jk(k,j)\in E}^{\max}, R_{i\in N}^{\max}, L_{ij(i,j)\in E}^{\max}, V_{i\in N}^{\max})$$

$$\frac{1}{2}(w^g)^T H^g w^g = \sum_{i\in N} c_{2,i}(P_i^G(t))^2 + \frac{\rho}{2}(B_i(t))^2 + \frac{\rho}{2}(P_i^G(t))^2 + \frac{\rho}{2}(Q_i^G(t))^2$$

$$(h^g)^T w^g = \sum_{i\in N} c_{1,i} P_i^G(t) + \rho \left( -\bar{B}_i(t) + \frac{v_{i,2}(t)}{\rho} \right) B_i(t) + \rho \left( -\bar{P}_i^G(t) + \frac{v_{i,2}(t)}{\rho} \right) P_i^G(t) + \rho \left( -\bar{Q}_i^G(t) + \frac{\sigma_{i,2}(t)}{\rho} \right) Q_i^G(t)$$

FIG. 22

$$\hat{B}_i(t+1) - (\hat{B}_i(t) - R_i(t)) \forall i \in N$$
$$-S_{ij}^{homoloss}(t) \quad \forall (i,j) \in E$$
$$T_{ji}(t) + P_{ji}(t) \quad \forall (i,j) \in E$$
$$-(W_{ij}(t) + W_{(N+i)(N+j)}(t)) \quad \forall i \in N$$
$$-\bar{Q}_i^G(t) \quad \forall i \in N$$
$$-(\bar{Q}_i^G(t) - R_i^D(t) - P_i^D(t)) \quad \forall i \in N$$
$$-\bar{Q}_{ij}(t) + Tr(Y_{ij}(t)W_i^B(t)) \quad \forall (i,j) \in E$$
$$-Q_{ji}(t) + Tr(\bar{Y}_{ij}(t)W_i^B(t)) \quad \forall (i,j) \in E$$
$$-P_{ij}(t) + Tr(Y_{ij}(t)W_i^B(t)) \quad \forall (i,j) \in E$$
$$-P_{ji}(t) + Tr(\bar{Y}_{ij}(t)W_i^B(t)) \quad \forall (i,j) \in E$$

SYSTEM AND METHOD FOR OPTIMAL POWER FLOW ANALYSIS

FIELD OF THE INVENTION

The present invention relates generally to power grids, and more particularly to optimizing power flows in the power grids.

BACKGROUND OF THE INVENTION

The Optimal Power Flow (OPF) problem for a power grid having alternating current (AC) circuits concerns the problem of determining bus voltages and generator power levels to minimize a cost function representing an operation of the power grid. The cost functions can include generator cost, resistive losses or tertiary voltage control. The minimization of the cost function is subject to OPF constrains that can include the AC power flow constraints, bounds on power generation, bounds on bus voltage magnitudes, bounds on thermal losses, and limits on power transfer on lines.

The conventional methods relax the OPF to find a solution using, e.g., the second order cone programming (SOCP). See, e.g., U.S. 2012/0150504. However, such approach provides optimal solution only under satisfaction of sufficient conditions for the relaxations. The sufficient conditions, e.g., rank condition, only hold under restrictive assumptions on the network topology and constraints on the OPF. Thus, the conventional methods are not suitable for analyzing OPF for arbitrarily structures of the power grid. In addition, the above methods provide no recourse when sufficient conditions for relaxation are not satisfied.

Thus, there remains a need to globally optimize electric power grids of various structures and configurations. In addition, when the power grid includes various storage devices, there is a need to optimize the power grid considering multiple time periods of optimization.

SUMMARY OF THE INVENTION

Some embodiments of the invention are based on a realization that OPF problem can be solved based on the spatial branch and bound framework with lower bounds on the optimal objective function value calculated by solving a semi-definite programming (SDP) relaxation of the OPF. Those embodiments are based on a recognition that search space of the solutions and constraints of the OPF problem can be partitioned using structure and characteristics of the elements of the power grid, and thus the branch and bound framework can be utilized to search for the global minimum.

In addition, some embodiments are based on a realization that SDP relaxation of the OPF or portions of the OPF should be used for determining the lower bounds on the optimal objective function. Usually, the branch and bound methods are implemented using linear under-approximation of the optimized function, because such approximation can be efficiently performed. However, the embodiments recognized that in the context of the power flow analysis of the power grid, the linear under-approximation of the cost function representing the power flow is inefficient due to the shallow structure of the cost function. Hence, it was realized that despite of complexity of the SDP over the linear under-approximation, the usage of the SDP approximation in the context of the power grids is advantageous.

Some embodiments of the invention are based on an additional realization that the branch and bound method should be implemented such that a search for the lowest lower and upper bound in a nested region can use, as a starting point, the result of the search in the region from which the nested region was partitioned according to the branch and bound principles. This realization is based in part on the recognition that the structure of the power grid has patterns or similarities repeated over the span of the grid. Thus, the result of the search in one region can be used to speed up the search over a different region.

Unfortunately, the widely used implementation of the SDP using interior point methods cannot accept the input specified by the previous search. Accordingly, various embodiments modify the SDP using various methods able to accept such input. For example, one embodiment uses the Lagrangian dual subgradient method to implement the SDP.

Another embodiment uses alternating direction method of multipliers (ADMM) method. Specifically, the usage of the ADMM method for SDP relaxation in a current iteration of the branch and bound method allows reusing the outputs of the previous iteration of the branch and bound method to accelerate the convergence of the method.

The resulting modifications of the branch and bound method allows to significantly increase the computational efficiency of the OPF problem. For example, some embodiments of the invention solve the OPF problems that cannot be solved using conventional approaches due to lack of memory to fit within a single processor. This efficiency allows using the embodiments to solve multi-period optimal power flow (MOPF) problems to global optimality. The multi-period version of the OPF is time coupled due to the integration of storage systems into the power grid, and ramp constraints on the generators.

Accordingly, some embodiments of the invention provide a method for globally optimizing a power flow in electric power grids during multiple time periods of operation. A spatial branch and bound (BB) procedure ensures that a globally optimal solution is attained. The BB procedure partitions the feasible region of the power flow problem, e.g., by partitioning the bound on generation variables and also constraints on voltage magnitudes, which speeds up convergence. A lower bound on the optimal solution is determined by semi-definite programming (SDP), which provides a maximal lower bound.

To accommodate large problems arising from several periods, the solution of the SDP in some embodiments of the invention includes (i) decoupling the time-coupling constraints by dualization with an augmented lagrangian formulation, (ii) solving SDP problems corresponding to individual time-steps and (iii) applying an alternating direction method of multipliers applied to converge the time-decoupled constraints.

Also, in some embodiments, the solution of the SDP corresponding to each time-step includes (i) performing a clique decomposition of the graph associated with the power grid, and (ii) applying an alternating direction method of multipliers to the augmented lagrangian formulation of the dual problem.

Accordingly, one embodiment discloses a method for determining a power flow of a power grid. The method includes optimizing, using a processor, an objective function representing an operation of the power grid using a spatial branch and bound (BB) framework for determining iteratively upper and lower bounds of the objective function, wherein the lower bounds are determined using a semi-definite programming (SDP) relaxation of an optimal power flow (OPF) problem.

Another embodiment discloses a method for solving an optimal power flow (OPF) problem optimizing an objective function representing an operation of a power grid. The method includes splitting iteratively a feasible region of the OPF problem into a nested tree of regions corresponding to a branch and bound (BB) tree, wherein the nested tree of regions includes at least a first region and a second region nested in the first region; determining an upper bound of the OPF problem in the second region; determining a lower bound of the OPF problem in the second region using a semi-definite programming (SDP) relaxation of the OPF problem, wherein a solution of the OPF problem corresponding to a lower bound of the first region is an input to the SDP relaxation; updating a lowest upper bound of the BB tree with the upper bound of the second region, if the upper bound of the second region is less than the lowest upper bound of the BB tree; updating a lowest lower bound of the BB tree with the lower bound of the second region, if the lower bound of the second region is greater than the lowest lower bound of the BB tree and the lower bound of the second region is lower than the lowest lower bound of other regions of the nested tree; updating the lowest lower bound of the BB tree with the lowest lower bound of other regions, if the lower bound of the second region is greater than the lowest lower bound of the BB tree and the lower bound of the second region is greater than the lowest lower bound of the other regions; and determining the optimal power flow based on the lowest upper bound of the second region if a difference between the lowest upper bound and the lowest lower bound of the second region is less than a threshold. The steps of the method are performed by a processor.

Yet another embodiment discloses a system for solving an optimal power flow (OPF) problem optimizing an objective function representing an operation of a power grid, comprising a processor for optimizing an objective function representing an operation of the power grid using a spatial branch and bound (BB) framework for determining iteratively upper and lower bounds of the objective function, wherein the lower bounds are determined using a semi-definite programming (SDP) relaxation of an optimal power flow (OPF) problem, wherein a solution of the OPF problem corresponding to a lower bound of a first region is an input to the SDP relaxation for a second region.

BRIEF DESCRIPTION OF THE DRAWINGS

FIGS. 7A, 7B, 7C are examples of different stages of BB method according to some embodiments of the invention;

FIGS. 8A, 8B are examples of different stages of BB method according to some embodiments of the invention;

FIGS. 9A, 9B, 9C are examples of different stages of BB method according to some embodiments of the invention;

FIGS. 10A, 10B are examples of different stages of BB method according to some embodiments of the invention;

FIGS. 12A, 12B are examples of different stages of BB method according to some embodiments of the invention;

FIGS. 13A, 13B are examples of different stages of BB method according to some embodiments of the invention;

FIG. 14 is a pseudo code providing definition of some matrices used by one embodiment of the invention;

FIGS. 18 and 19 are pseudo codes defining some variables and coefficient matrices in the ADMM for time-step t=1 according to one embodiment of the invention;

FIGS. 20 and 21 are pseudo codes defining some variables and coefficient matrices in the ADMM for time-step t=2 . . . T−1 according to one embodiment of the invention;

FIGS. 22 and 23 are pseudo codes defining some variables and coefficient matrices in the ADMM for time-step t=T according to one embodiment of the invention;

DETAILED DESCRIPTION OF THE PREFERRED EMBODIMENTS

Electrical Power Network Topology and Representative Graph

Figure 1:
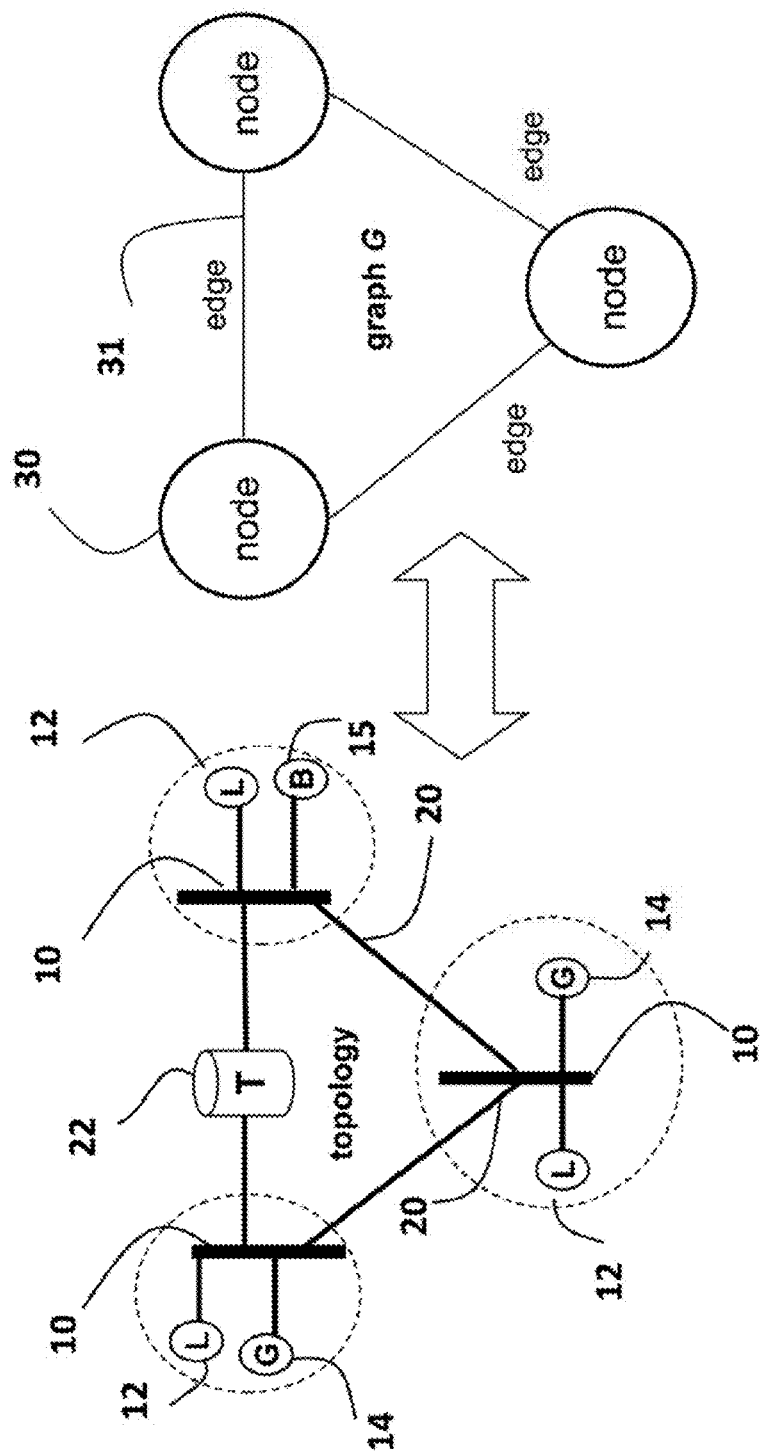
FIG. 1 is a topology of a power grid employing some embodiments of the invention.

FIG. 1 shows a topology of an electric power grid that can use embodiments of the invention. The network can include AC components, and DC components connected by convertors. The variables and constraints that control the operation of the power grid are continuously controllable.

The power grid includes buses 10 locally connected to loads (L) 12 and generators (G) 14. The buses are interconnected by transmission lines 20, also known as branches (B). Some of the transmission lines can be connected to transformers (T) 22. The topology and/or structure of the power grid can be represented by a graph G of nodes 30 representing, e.g., generators and connected loads). The nodes in the graph are connected by edges 31 representing transmission lines.

The generators supply active power (measured in, e.g., Mega Watts (MW)), and reactive power (measured in Mega Volt Ampere Reactive (MVar)). The loads consume the power. The power is defined by voltage magnitude and phase angle.

The parameters for the optimization include, but are not limited to, an admittance matrix based on the branch impedance and bus fixed shunt admittance, and the flow capacity ratings, i.e., the maximal total power flow constrained by thermal ratings.

Figure 2:
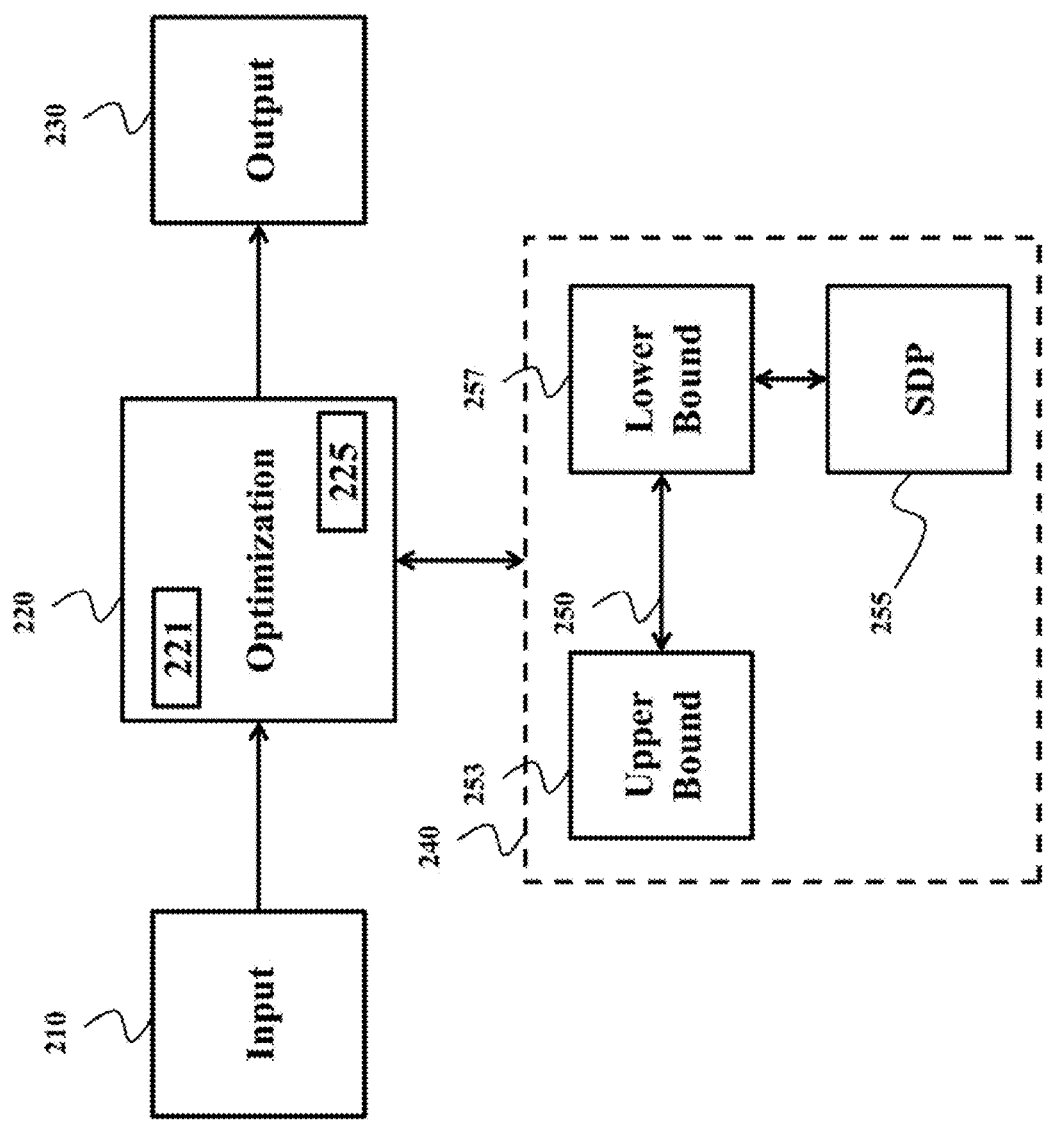
FIG. 2 is a schematic of a system and a method for determining a power flow of the power grid according to some embodiments of the invention.

FIG. 2 shows a schematic of a system and a method for determining a power flow of a power grid according to some embodiments of the invention. Some embodiments of the invention are based on a realization that OPF problem can be solved based on the spatial branch and bound framework with lower bounds on the optimal objective function value calculated by solving a semi-definite programming (SDP) relaxation of the OPF. Those embodiments are based on recognition that search space of the solutions and constraints of the OPF problem can be partitioned using structure and characteristics of the elements of the power grid, and thus the branch and bound framework can be utilized to search for the global minimum.

Accordingly, the method of FIG. 2 optimizes 220 an objective function 221 representing an operation of the power grid using a spatial branch and bound (BB) framework 240. The optimization can be performed by a processor 225. In various examples of described herein, the optimization is a minimization of the objective function. However, it should be understood, the problem can also be posed as maximization, e.g., by reversing the sign of the objective function.

Branch and bound (BB) is a method for finding optimal solutions of various optimization problems and includes of an iterative enumeration of all candidate solutions, where large subsets of fruitless candidates are discarded by using upper 253 and lower 257 bounds of the quantity being optimized.

According to the BB framework, if the lower bound for some tree node (set of candidates) A is greater than the upper bound for some other node B, then A may be safely discarded from the search. This step is called pruning, and is usually implemented by maintaining a global variable m (shared among all nodes of the tree) that records the minimum upper bound seen among all subregions examined so far. Any node whose lower bound is greater than m can be discarded.

Hence, various embodiment of the invention determine 250 iteratively upper 253 and lower 257 bounds of the objective function. In addition, in one embodiment, the lower bounds on the optimal objective function are determined using a semi-definite programming (SDP) 255 relaxation of an optimal power flow (OPF) problem. Usually, the branch and bound methods are implemented using linear under-approximation of the optimized function, because solution of such approximation can be efficiently performed. However, the embodiments recognized that in the context of the power flow analysis of the power grid, the linear under-approximation of the cost function representing the power flow is inefficient due to the over approximation of the feasible region that results from linear approximations. Hence, it was realized that despite of solution complexity of the SDP over the linear under-approximation, the usage of the SDP approximation in the context of the power grids is advantageous.

In some embodiments, the input 210 the optimization 20 includes one or combination of the following.
1) A graph $G(N,E)$ with a set of N nodes connected by a set of E edges (i,j).
2) An admittance of the lines $y_{ij}=g_{ij}+jb_{ij}(i,j) \in E$, where g represents conductance of the line, b represents susceptance (imaginary part of the admittance) of the line with $j=\sqrt{-1}$.
3) Constraints on active power $P_i^{G,min}, P_i^{G,max} i \in N$ that can be produced by the generators, and the reactive power $Q_i^{G,min}$, $Q_i^{G,max} \forall i \in N$ that can be produced by the generators.
4) Constraints $S_{ij}^{max}, P_{ij}^{max} \forall (i,j) \in E$ on apparent and active power transferred on the lines.
5) Limits $V_i^{min}, V_i^{max} \forall i \in N$ on voltage magnitudes at the buses.
6) Constraints $L_{ij}^{max} \forall (i,j) \in E$ on thermal losses on the lines.

The output 230 of the optimization performed at times t= 1, . . . , T can include one or combination of complex valued voltages $V_i(t) \forall i \in N$ at the buses, active and reactive power levels $P_i^G(t), Q_i^G(t) \forall i \in N$ of the generators, and energy storage device state-of-charge levels $B_i(t) \forall i \in N$. Example devices include, but are not limited to batteries, transformers, capacitors, inductors, and step voltage regulators.

The global optimization uses a decision function $f(P^G, Q^G, V, B)$ that depends on active power generation variables $P^G = (P^G(1), \ldots, P^G(T)), P^G(t)=P_1^G(t), \ldots, P_{|N|}^G(t))$ reactive power generation variables $Q^G=(Q^G(1), \ldots, Q^G(T)), Q^G(t)=(Q_1^G(t), \ldots, Q_{|N|}^G(t))$, complex valued voltages $V= (V(1), \ldots, V(T)), V(t)=(V_1(t), \ldots, V_{|N|}(t))$, and battery state-of-charge levels $B=(B(1), \ldots, B(T)), B(t)=(B_1(t), \ldots, B_{|N|}(t))$ at the buses.

Figure 3:
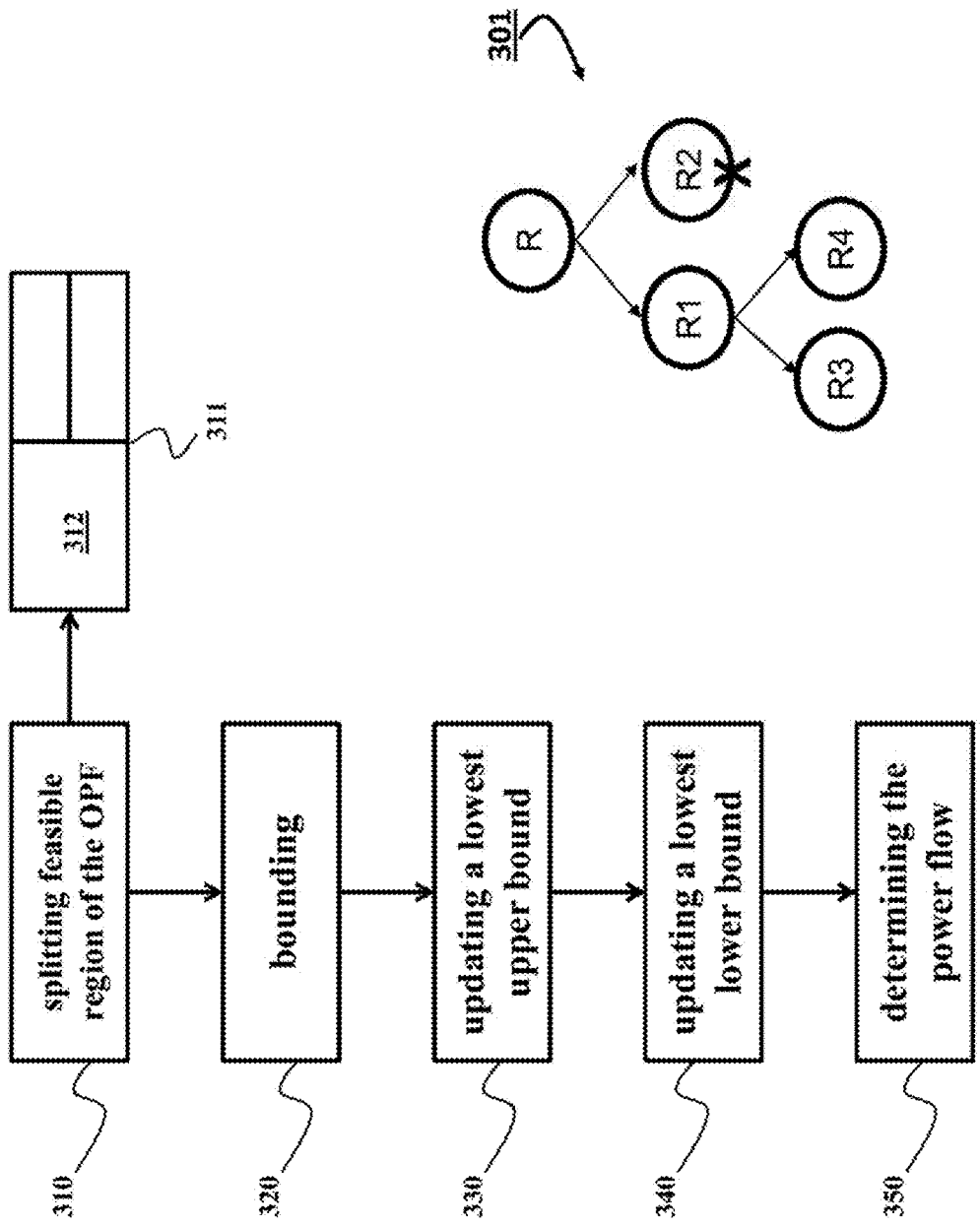
FIG. 3A is a flow chart of a method for performing the optimization using the branch and bound (BB) framework according to some embodiments.
FIG. 3B is an example of the BB tree.

FIG. 3A shows a flow chart of a method for performing the optimization 220 using the BB framework 240 according to some embodiments. The method splits 310 iteratively a feasible region of the OPF problem into a nested tree of regions corresponding to a BB tree, wherein the nested tree of regions includes a first region 311 and a second region 312 nested in the first region.

FIG. 3B shows an example of the BB tree 301. The tree includes a root node R, and after partitioning, child nodes R1 and R2. The tree is used to determine the global minimum for the OPF by constructing a convex relaxation of the feasible region R associated with the OPF that is easier to solve and provides a lower bound (L) on the optimal objective function value.

Figure 4:
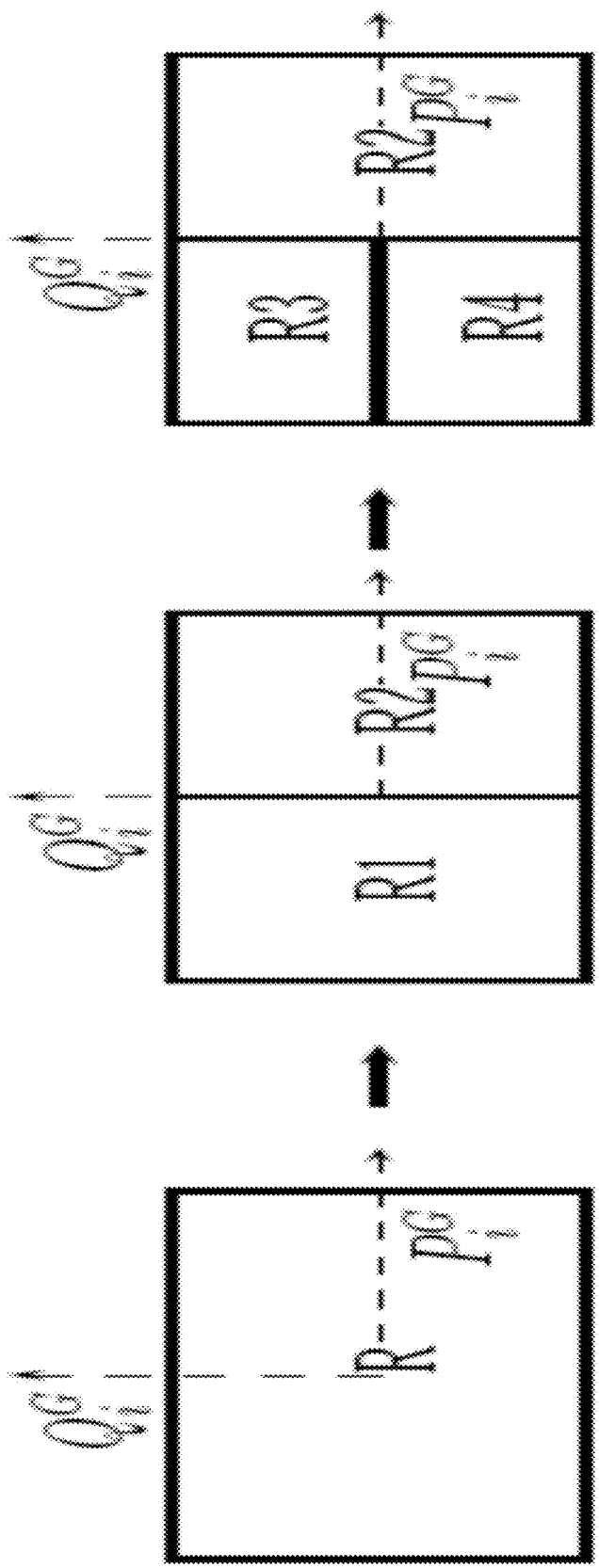
FIGS. 4 and 5A are examples of partitioning the regions according to different embodiments.

FIG. 4 show an example of partitioning the regions according to some embodiments. In some embodiments, the partitioning is based on structure of elements of the power grid. For example, the partitioning of the feasible region in the instance of optimal power flow problems can be accomplished by rectangular bisection on $P_i^G$ or $Q_i^G$. The splitting in FIG. 4 is an instance of partitioning of the feasible region using variable bounds.

Figure 5A:
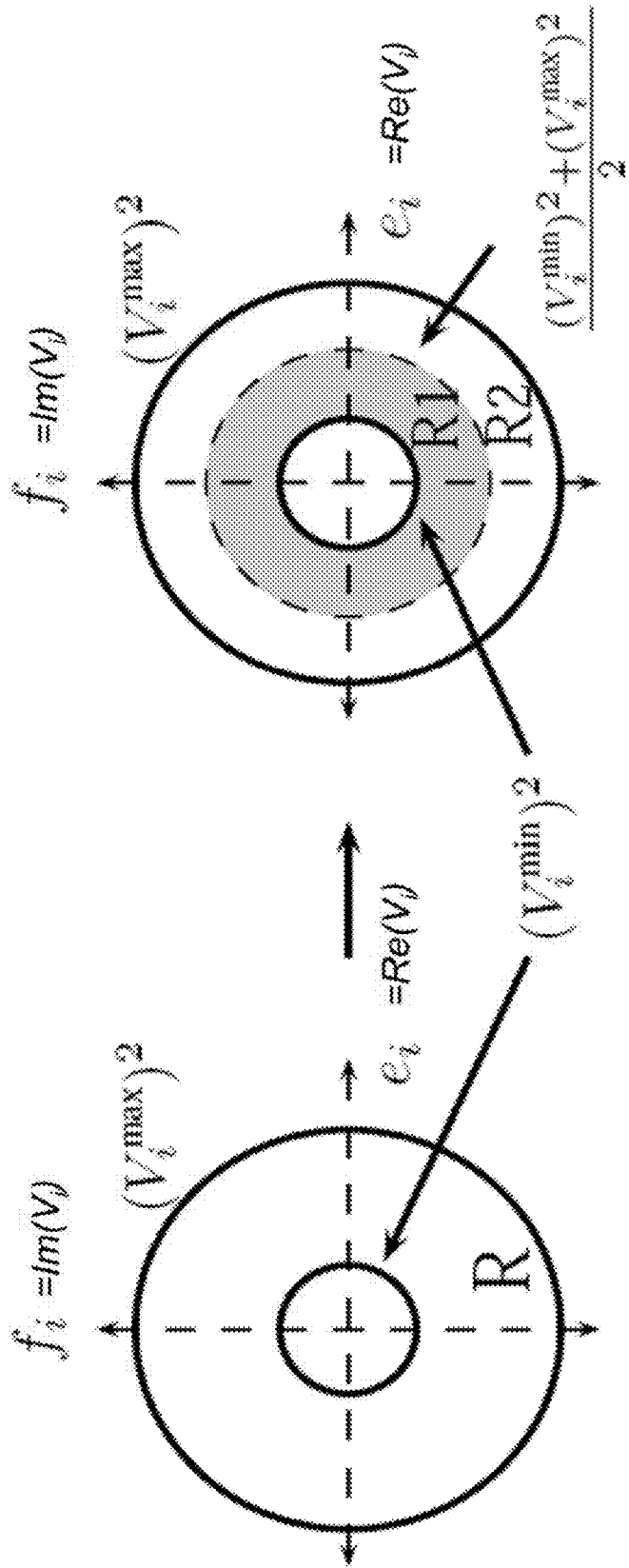
Figure 5B:
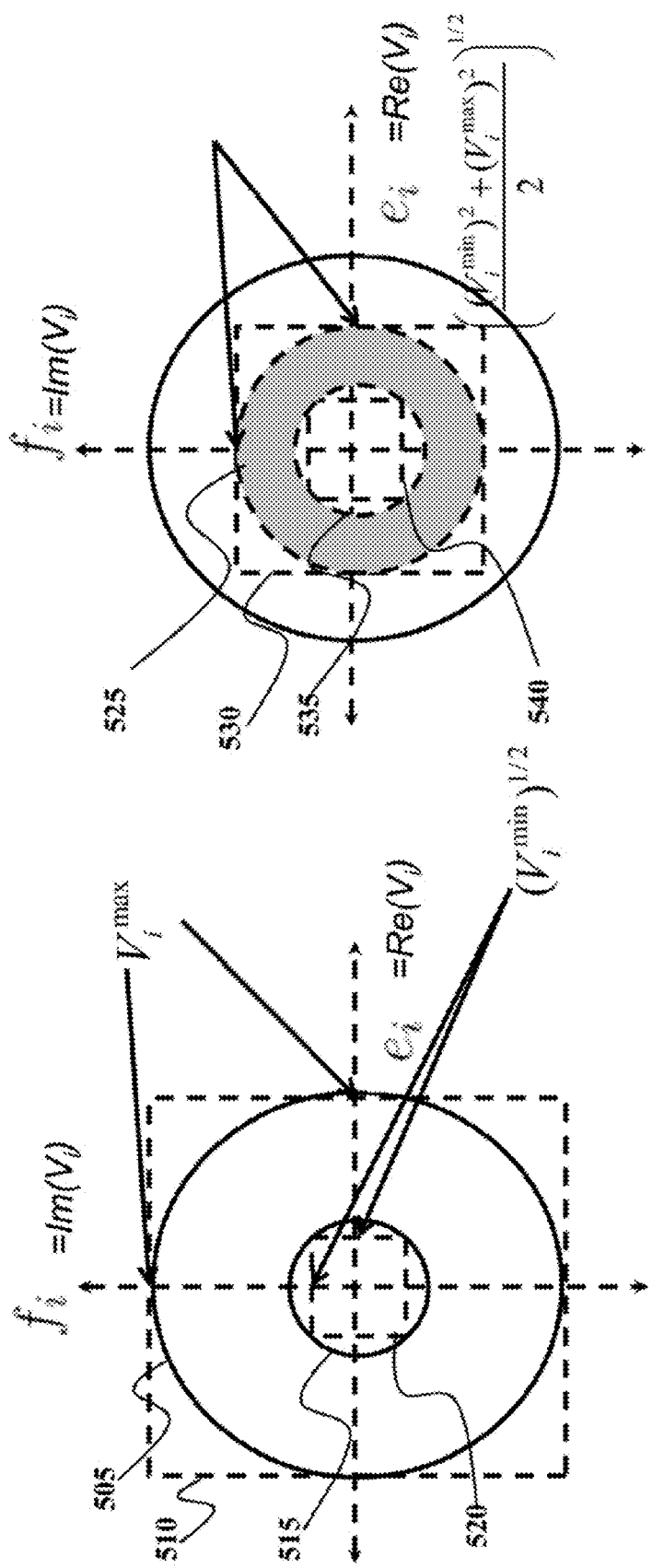
FIG. 5B demonstrates the advantage of using partitioning of region shown in FIG. 5A.

FIG. 5A shows an example of a radial bisection on the voltage magnitudes $(e_i^2+f_i^2)^{0.5}$. In contrast with the embodiments of FIG. 4, the splitting in FIG. 5A is based on constraint. Global optimization software only uses variable splitting instead of constraint splitting. FIG. 5B shows the feasible region when expressed using variable bounds. In this case, the area between the larger dotted square 510 and the smaller dotted square 520 is the feasible region using variable bounds of the region enclosed by circles 505 and 515. Similarly, 530 and 540 show the area enclosed from using variable bounds as opposed to the original area enclosed by circles 525 and 535. Using the constraint splitting the feasible region is exactly captured as opposed to being enlarged when using variables bounds.

The bounding procedure 320 of the BB framework determines the upper and the lower bounds of the objective function in at least some regions including the first and the second regions. Some embodiments of the invention are based on an additional realization that the branch and bound method should be implemented such that a search for the lowest lower and upper bound in a nested region can use, as a starting point, the result of the search in the region from which the nested region was partitioned according to the branch and bound principles. This realization is based in part on the recognition that the structure of the power grid has patterns or similarities repeated over the span of the grid. Thus, the result of the search in one region can be used to speed up the search over a different region. Accordingly, one embodiment uses a solution of the OPF problem corresponding to the lower bound of the first region as an input to the SDP relaxation for determining the lower bound of the second region.

According to the BB framework, the method updates 330 a lowest upper bound of the BB tree with an upper bound of the second region, if the upper bound is less than the lowest upper bound of the BB tree, and updates 340 a lowest lower bound of the BB tree with a lower bound of the region, if the lower bound is greater than the lowest lower bound of the BB tree and lower than the lower bounds of other regions of the nested tree. In some embodiments, the method also updates the lowest lower bound of the BB tree with the lowest lower bound of other regions, if the lower bound of the region is greater than the lowest lower bound of the BB tree and greater than the lowest lower bound of the other regions.

The power flow is determined 350 based on the lowest upper bound of the BB tree if a difference between the lowest upper bound and the lowest lower bound of the BB tree is less than a threshold.

Example of the Branch and Bound Solution

Figure 6A:
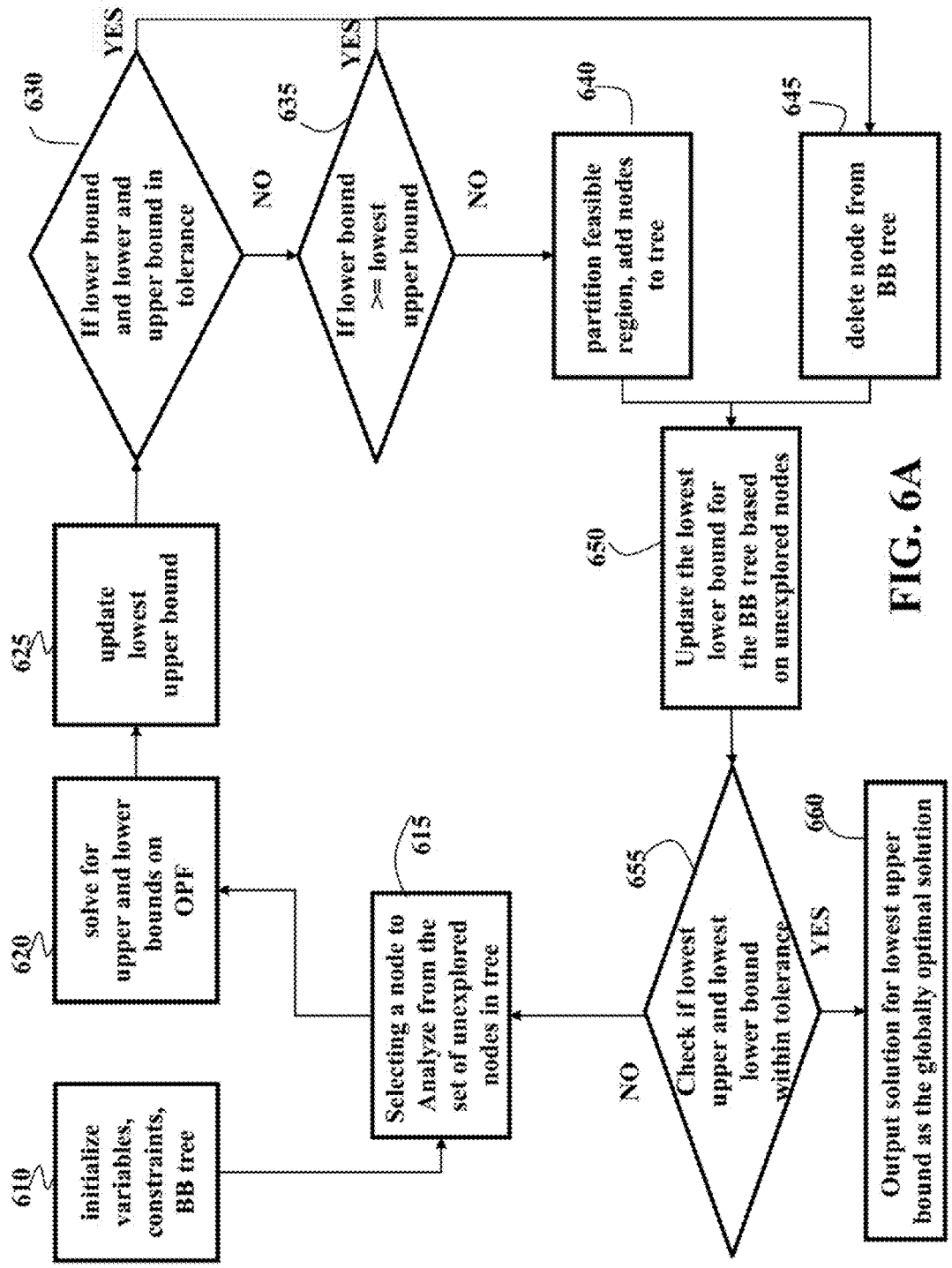
FIGS. 6A and 6B show flow chart of the BB method according to embodiments of the invention.

FIG. 6A shows a flow chart of a BB method for solving the OPF problem according to one embodiment. The BB method starts with initializing 610 the lowest upper bound on the global optimum for the problem and lowest lower bound for the global optimum of the problem respectively to $U^{best}=+\infty$, $L^{best}=-\infty$.

At each node of the BB tree, an upper bounding problem is solved 620 to obtain the upper bound (U) and a lower bounding problem is solved to obtain the lower bound (L) as shown in FIG. 7A. For example, the upper bound (U) can be determined by using local minimization, which also yields a feasible solution.

The BB methods updates 625 the lowest upper bound ($U^{best}$), if $U<U^{best}$ and updates the lowest lower bound ($L^{best}$) based on the nodes in the tree that are to be analyzed and lower bound obtained for the current node (L). For nodes in BB tree that have not been solved, an estimate of the lower bound is used. This is typically the lower bound value of the parent node from which it was derived.

If lower bound and upper bound (U−L), or (U−L)/U 630 or ($U^{best}$−L) 635 is less than some predetermined threshold τ, then the current node is deleted from the BB tree 645. If not, the feasible region of the current node is partitioned and two nodes are added to the list of unexplored nodes in the BB tree 640. Next, the lowest lower bound $L^{best}$ is updated 650 based on the unexplored nodes in the tree.

If ($U^{best}-L^{best}$), or optionally ($U^{best}-L^{best}$)/$U^{best}$, is less than some predetermined threshold τ 655, then the BB method terminates with the current lowest upper bounding solution 660. Otherwise another node from the BB tree 615 is selected to update/improve the lower and upper bound using the solving steps.

Figure 6B:
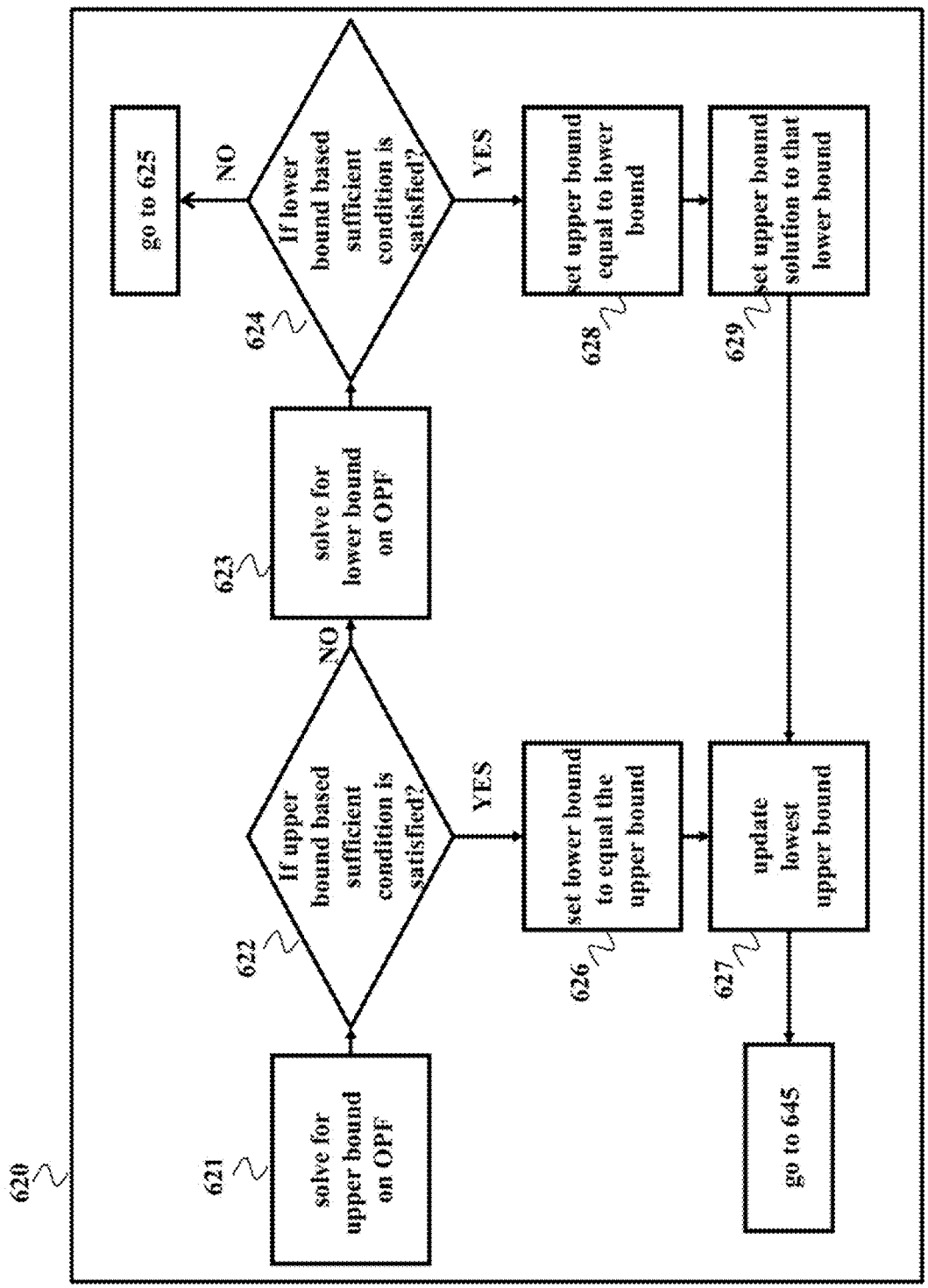

FIG. 6B shows a block diagram of one embodiment of the BB method, in which the solution of the upper and lower bounding problem 620 is expanded. The upper bound problem for the node is solved 621 first. Using the obtained solution a sufficient condition for the upper bound solution to be a globally optimal solution is checked 622. If the sufficient condition 622 holds then the lower bounding problem for the node is not solved. Instead, the lower bound for the node is set to that of the upper bound 626. Then, the lower upper bound for the BB tree is updated 627 and the algorithm proceeds to 645 of the flowchart in FIG. 6A. If the sufficient condition 622 does not hold then, the lower bounding problem is solved 623. The solution of the lower bounding problem is checked 623 if it satisfies a sufficient condition that allows constructing an upper bound solution with same objective value as the lower bound solution. If the lower bound sufficient condition does not hold then algorithm proceed to 625 in FIG. 6A. If the lower bound sufficient condition 623 holds then, the upper bound for the node is set to that obtained from the lower bound 628 and the upper bound solution is set to that obtained from the lower bounding problem 629. The algorithm then proceeds to 629. Typically, the computation of the lower bound is expensive and then sufficiency check in 622 can help in avoiding unnecessary calculations when the upper bound problem is indeed able to solve the node to global optimality.

For instance, after the solution of the upper and lower bounding problems for root node R, $U^{best}$ is set to U. Further, (U−L), and (U−L)/U and ($U^{best}$−L) are all larger than the predetermined threshold T. In this case, global optimum cannot be determined from R and as shown in FIG. 7B, the feasible region R is partitioned into R1 and R2, and the BB procedure is repeated. The resulting BB tree 700 after the partition is shown in FIG. 3C. Now R1 and R2 are placed in a list of nodes 710 that need to be explored and are temporarily assigned the lower bound L based on the lower bound obtained from the parent node R as shown in FIG. 3C. Following this, $L^{best}$ can be updated as the smallest of the temporary lower bounds in the list of the unexplored nodes in the list. In this case, $L^{best}=L$.

After a node has been processed but the termination conditions for BB have not been satisfied and there exist nodes that are yet unanalyzed the BB procedure proceeds by selecting one of the unanalyzed nodes and calculating the upper and lower bounds for the particular specification of the feasible region.

For instance, suppose the region R2 is selected to be analyzed and upper and lower bounding problems are solved to obtain U2,L2 respectively as shown in FIG. 8A. Further suppose that $U2-L2<\tau$ and $U2=U^{best}$. In this case, a globally optimal solution has been obtained for region corresponding to node R2 and the globally optimal solution has a larger objective value than the best solution identified from previous explorations in the BB tree. In such a case, the node R2 820 is deemed as fathomed (as shown in FIG. 8B by X) since exploration of any further partition of its feasible region cannot result in a solution that is better than the best upper bound solution that has been obtained thus far. The list of unexplored nodes 810 now only includes R1. Also, there is no update of $U^{best},L^{best}$ since $U2=U^{best}$ and $L^{best}$ determined from the list of unexplored nodes is still L.

The node R1 is explored and the upper and lower bounding problems are solved to obtain U1,L1 respectively as shown in FIG. 9A. In this case, suppose (U1−L1), and (U1−L1)/U1 and ($U^{best}$−L) are all greater than the predetermined threshold τ and $U1<U^{best}$. Hence, update $U^{best}=U1$. Because the termination condition is not satisfied the feasible region corresponding to R1 is further partitioned into regions R3 and R4 as shown in FIG. 9B. The resulting BB tree 900 and the list of unexplored nodes 910 are shown in FIG. 9C. The unexplored nodes inherit the lower bounds from the parent node R1 and hence, $L^{best}$ which is based on the lower bound of unexplored nodes is set to L1.

Suppose R3 is selected to be explored from the list of unexplored nodes and the upper, lower bounds be computed for R3 as respectively U3,L3 as shown in FIG. 10A. Further suppose that $U3-L3<\tau$ and $U3=U^{best}$. In this case, a globally optimal solution has been obtained for region corresponding to node R3 and the globally optimal solution has same objective value as the best solution identified from previous explorations in the BB tree. In such a case, the node R3 is deemed as fathomed (as shown in FIG. 10B by X) since exploration of any further partition of its feasible region cannot result in a solution that is better than the best upper bound solution that has been obtained thus far. The list of unexplored nodes 1010 of the BB tree 1000 now only includes R4. Also, there is no update of $U^{best},L^{best}$ since $U3=U^{best}$ and $L^{best}$ determined from the list of unexplored nodes is still L1.

Figure 11B:
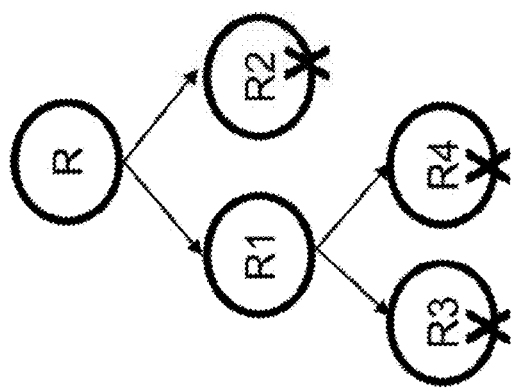
FIGS. 11A, 11B are examples of different stages of BB method according to some embodiments of the invention.
Figure 11A:
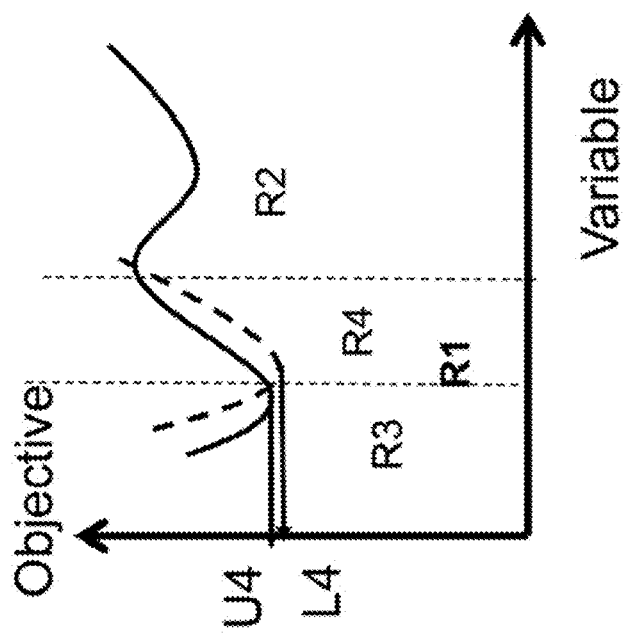

The node R4 is explored and upper, lower bounds U4,L4 are obtained for the feasible region corresponding to R4 as shown in FIG. 11A. Further suppose that $U4-L4<\tau$ and $U4>U^{best}$. In this case, a globally optimal solution has been obtained for region corresponding to the node R4 and the globally optimal solution has a larger objective value than the best solution identified from previous explorations in the BB tree. In such a case, the node R4 is deemed as fathomed (as shown in FIG. 11B by X) since exploration of any further partition of its feasible region cannot result in a solution that is better than the best upper bound solution that has been obtained thus far. The list of unexplored nodes is now empty. At this point the globally optimal solution has been found and it is the solution corresponding to the upper bound of $U1=U^{best}$.

In other words, if there is an optimality gap, then the feasible region is partitioned into two sub-regions, over which the BB procedure is repeated. Nodes are deleted (in branch and bound terms "fathomed" X) when the lower bound L is greater than the current best upper bound. The BB procedure terminates when all nodes have been processed. In that case, the best upper bounding solution is returned as the globally optimal solution.

FIGS. 12A and 12B show another example, in which the upper bounding solution for R1 1210 satisfies the sufficient condition 622 in FIG. 6B. In this case, L1=U1 is set as in 626 of FIG. 6B. By step 627 of FIG. 6B, the lowest upper bound is updated as $U^{best}=U1$. The BB algorithm proceeds to step 645 in FIG. 6A and deletes the node R1 1220 as shown in FIG. 12B. At this point, there are no more nodes to be evaluated and the algorithm returns the upper bounding solution for R1 as the globally optimal solution. The algorithm exploits the satisfaction of the sufficient condition to avoid exploring the BB tree further and this leads to significant computational savings.

FIGS. 13A and 13B show another example, in which the upper bounding solution for R1 does not satisfy the sufficient condition 622 but the sufficient condition in 624 is satisfied. Then, proceeding as per FIG. 6B the upper bound for the node is updated as U1=L1 and the best upper bound for the BB tree is updated as $U^{best}=U1$. In this case proceeding 625 of FIG. 6A it is clear the upper and lower bound for the node are within tolerance and the algorithm proceeds to 645 of FIG. 6A. The current node R1 is fathomed as in FIG. 13B. Since there are no more nodes in the BB tree the lower bounding solution is returned as the globally optimal solution. The algorithm exploits the satisfaction of the sufficient condition to avoid exploring the BB tree further and this leads to significant computational savings.

Multi-Period Optimal Power Flow

In some embodiments, the power grid includes at least one storage system, and the objective function represents the operation of the power grid over time. In those embodiments the OPF is a multi-period optimal power flow (MOPF) problem.

The multi-period version of the OPF is a time coupled version of the optimal power flow problem. The generators typically have ramp constraints that limit the amount by which limits the change in power generated over successive time instances. Consequently, an optimized solution can only be obtained if multiple time-periods are taken into account simultaneously ensuring future fluctuations in load can appropriately accommodated for given the limits in the ramping of generators. Also, power grids these days are closely integrated with renewable energy sources such as wind and solar energy. Energy storage is necessary to allow effective use of such renewables since they are intermittent. Storage works to match the periods of availability of these sources with the demands. Again, the optimization problem needs to account for multiple time-periods since the benefit of supplying power from storage at the present time must be weighed against possible more efficient use of the energy in storage device at future time instances. Thus, integration of storage into the power grid and inclusion of ramp constraints on the generators results in MOPF problems.

In one embodiment, the form of the function $f$ is quadratic and strictly increasing:

$$f(P^G, Q^G, V, B) = \sum_{t=1}^{T} \sum_{i \in N} \left( c_{2i}(P_i^G(t))^2 + c_{1i} P_i^G(t) + c_{0i} \right),$$

where c indicates constants, with $c_{2i}, c_{1i} \geq 0 \forall i \in N$.

The equality constraints, inequality constraints and bounds on the decision variables are used to model the limits of feasible operation of the network. The operation of the electrical network by the equality constraints is $$h_n(P^G(t), Q^G(t), V(t), B(t)) = 0 \forall n=1, \ldots, Ne, t=1, \ldots, T,$$

where Ne indicates the number of equality constraints.

The constraints on the power transferred on the lines and thermal losses ensuring feasible operation are modeled as inequality constraints $$g_n(P^G(t), Q^G(t), V(t), B(t)) \leq 0 \forall n=1, \ldots, Ni, t=1, \ldots, T,$$

where Ni indicates the number of inequality constraints.

To determine the voltages at the buses and the powers produced by the generators, some embodiments solve the following optimization problem to global optimality:

$$\begin{aligned}
\text{minimize} \quad & \sum_{t=1}^{T} f(P^G(t), Q^G(t), V(t), B(t)) \\
\text{subject to} \quad & h_n(P^G(t), Q^G(t), V(t), B(t)) = 0 \forall n = 1, \ldots, Ne, t = 1, \ldots, T \\
& g_n(P^G(t), Q^G(t), V(t), B(t)) \leq 0 \forall n = 1, \ldots, Ni, t = 1, \ldots, T,
\end{aligned} \quad (1)$$

where $\text{Re}(V_i), \text{Im}(V_i)$ denote the real and imaginary parts of the complex voltage $V_i$, respectively, and $h_n$ represents equality constraints and $g_n$ represents equality constraints.

Multi-Period Optimal Power Flow—Constraints

In one embodiment, the equality constraints $$h_n(P^G(t), Q^G(t), V(t), B(t)) = 0 \forall n=1, \ldots, Ne, t=1, \ldots, T$$

are represented as

Power Flows on the Lines $$\left. \begin{aligned} S_{ij} &= V_i(y_{ij}(V_i - V_j))^* \\ S_{ji} &= V_j(y_{ij}(V_j - V_i))^* \end{aligned} \right\} \forall (i, j) \in E$$

Power Balances at the Buses $$\sum_{j \in N(i)} S_{ij} = S_i^G - S_i^D - R_i \forall i \in N$$

Battery Dynamics $$B_i(t+1) = B_i(t) + \eta R_i(t) \Delta t \forall i \in N$$

$$B_i(0) = B_i 0$$

where $S_{ij}(t)=P_{ij}(t)+jQ_{ij}(t)$ denotes the complex valued power transferred from bus i to bus j at time instant t, $S_{ji}(t)=P_{ji}(t)+jQ_{ji}(t)$ denotes the complex valued power transferred from bus j to bus i at time instant t, $(V_i(t))^*$ denotes the complex conjugate of the complex valued variable, $S_i^G(t)=P_i^G(t)+jQ_i^G(t)$ denotes the complex valued power produced by the generators at time instant t, $S_i^D(t)=P_i^D(t)+jQ_i^D(t)$ denotes the complex valued power demands, $R_i(t)$ is the active power used to charge the battery connected to bus i at time instant t, $B_i^0$ is the initial state-of-charge of the battery connected to bus i, $\eta$ is the storage efficiency of the battery, and $\Delta t$ is the duration of the time period. The variables representing power flow on the lines are used for convenience.

In one embodiment for time period $t=1, \ldots, T$, the inequality constraints $$g_n(P^G, Q^G, V) = 0 \forall n=1, \ldots, Ni, t=1, \ldots, T$$

are represented as follows,

Limit on Active Power Transferred on Lines $$\left. \begin{array}{l} P_{ij}(t) \leq P_{ij}^{max} \\ P_{ji}(t) \leq P_{ij}^{max} \end{array} \right\} \forall (i,j) \in E$$

Limit on Thermal Loss on Lines $$P_{ij}(t) + P_{ji}(t) \leq L_{ij}^{max} \forall (i,j) \in E$$

Limit of Power Generation $$P_i^{G,min} \leq P_i^G(t) \leq P_i^{G,max}, Q_i^{G,min} \leq Q_i^G(t) \leq Q_i^{G,max} \forall i \in N$$

Limit on Voltage Magnitude $$V_i^{min} \leq \sqrt{Re(V_i(t))^2 + Im(V_i(t))^2} \leq V_i^{max} \forall i \in N$$

Limit on State-of-Charge of Batteries $$B_i^{min} \leq B_i(t) \leq B_i^{max} \forall i \in N$$

Limit on Rate of Charge or Discharge of Batteries $$R_i^{min} \leq R_i(t) \leq B_i^{max} \forall i \in N$$

and for time periods $t=1, \ldots, T-1$

Ramp Limit on Generator Power Generation $$\Delta P_i^{min} \leq P_i^G(t+1) - P_i^G(t) \leq \Delta P_i^{max} \forall i \in N$$

$$\Delta Q_i^{min} \leq Q_i^G(t+1) - Q_i^G(t) \leq \Delta Q_i^{max} \forall i \in N$$

Semidefinite Program Based Lower Bound

In various embodiments, the lower bound for OPF is determined by solving the SDP relaxation of the OPF. In one embodiment, the SDP is given by:

minimize $F(P^G, Q^G, W, B)$ subject to $H_n(P^G(t), Q^G(t), W(t), B(t)) = 0 \forall n=1, \ldots, Ne, t=1, \ldots, T$ to $G_n(P^G(t), Q^G(t), W(t), B(t)) \leq 0 \forall n=1, \ldots, Ni, t=1, \ldots, T$ $(V_i^{min})^2 \leq Tr(M_i W(t)) \leq (V_i^{max})^2 \forall i \in N, t=1, \ldots, T$ $W(t) \succeq =0, W(t)$ is $2|N| \times 2|N|$ symmetric matrix $B_i(t+1) = B_i(t) + \eta R_i(t) \Delta t \forall i \in N, t=1, \ldots, T$ $\Delta P_i^{min} \leq P_i^G(t+1) - P_i^G(t) \leq \Delta P_i^{max} \forall i \in N, t=1, \ldots, T-1$ $\Delta Q_i^{min} \leq Q_i^G(t+1) - Q_i^G(t) \leq \Delta Q_i^{max} \forall i \in N, t=1, \ldots, T-1$, (2)

where $W(t) \succeq =0$ denotes that matrix $W(t)$ must be positive semidefinite, the matrix operator $Tr()$ is defined as $$Tr(AB) = \sum_{n=1}^{|N|} \sum_{m=1}^{|N|} A_{n,m} B_{m,n}$$

and the matrix $M_i$ is defined as $$M_i = \begin{bmatrix} \zeta_i \zeta_i^T & 0 \\ 0 & \zeta_i \zeta_i^T \end{bmatrix},$$

where $\zeta_i$ denotes a vector of size $|N|$ with a 1 at the i-th component and zero elsewhere.

The matrix $W(t)$ is a relaxation of the outer vector product of the voltage variable vector, $$\begin{bmatrix} Re(V(t)) \\ Im(V(t)) \end{bmatrix} [Re(V(t)) \; Im(V(t))].$$

In the preferred embodiment, the objective function is, $$F(P^G, Q^G, W, B) = \sum_{t=1}^{T} \sum_{i \in N} \left( c_{2i}(P_i^G(t))^2 + c_{1i} P_i^G(t) + c_{0i} \right).$$

The equality constraints in the semidefinite relaxation (Eq. 2) are written as, $$\left. \begin{array}{l} P_{ij}(t) = Tr(Y_{ij} W(t)) \\ Q_{ij}(t) = Tr(\overline{Y}_{ij} W(t)) \\ P_{ji}(t) = Tr(Y_{ji} W(t)) \\ Q_{ji}(t) = Tr(\overline{Y}_{ji} W(t)) \end{array} \right\} \forall (i,j) \in E$$

$$P_i^G(t) - P_i^D(t) - R_i(t) = Tr(Y_i W(t)) \forall i \in N$$

$$Q_i^G(t) - Q_i^D(t) = Tr(\overline{Y}_i W(t)) \forall i \in N,$$

where, the matrices $Y_{ij}, Y_{ji}, Y_i, \overline{Y}_i$ are defined as shown in FIG. 14.

Alternating Direction Method of Multipliers

Some embodiments use the alternating direction method of multipliers (ADMM) for determining the lower bounds. Specifically, the usage of the ADMM method for SDP relaxation in a current iteration of the branch and bound method allows reusing the outputs of the previous iteration of the branch and bound method to accelerate the convergence of the method. The objective function of the OPF problem is typically quadratic in the real power from generators. The use of the ADMM for solving such SDP relaxations does not scale well when general quadratic terms are present. This embodiment is based on the realization that the number of generators in the typical power grid is small compared to the buses and the quadratic terms do not involve any cross terms. Thus, the quadratic cost in the context of ADMM for SDP for OPF problem can be handled efficiently.

ADMM Based Lower Bound

The SDP relaxations of the multi-period optimal power flow problem tend to be large scale problems. Therefore, some embodiments of the invention use decomposition methods to solve the problems effectively. For example, some embodiments take advantage from the recognition that the computational efficiency of the ADMM method can be improved by decomposing the semidefinite constraint in the SDP into semidefinite constraints on smaller blocks based on the electrical network. This approach allows accelerating the computation and further increases the efficiency of the branch and bound method.

Figure 15:
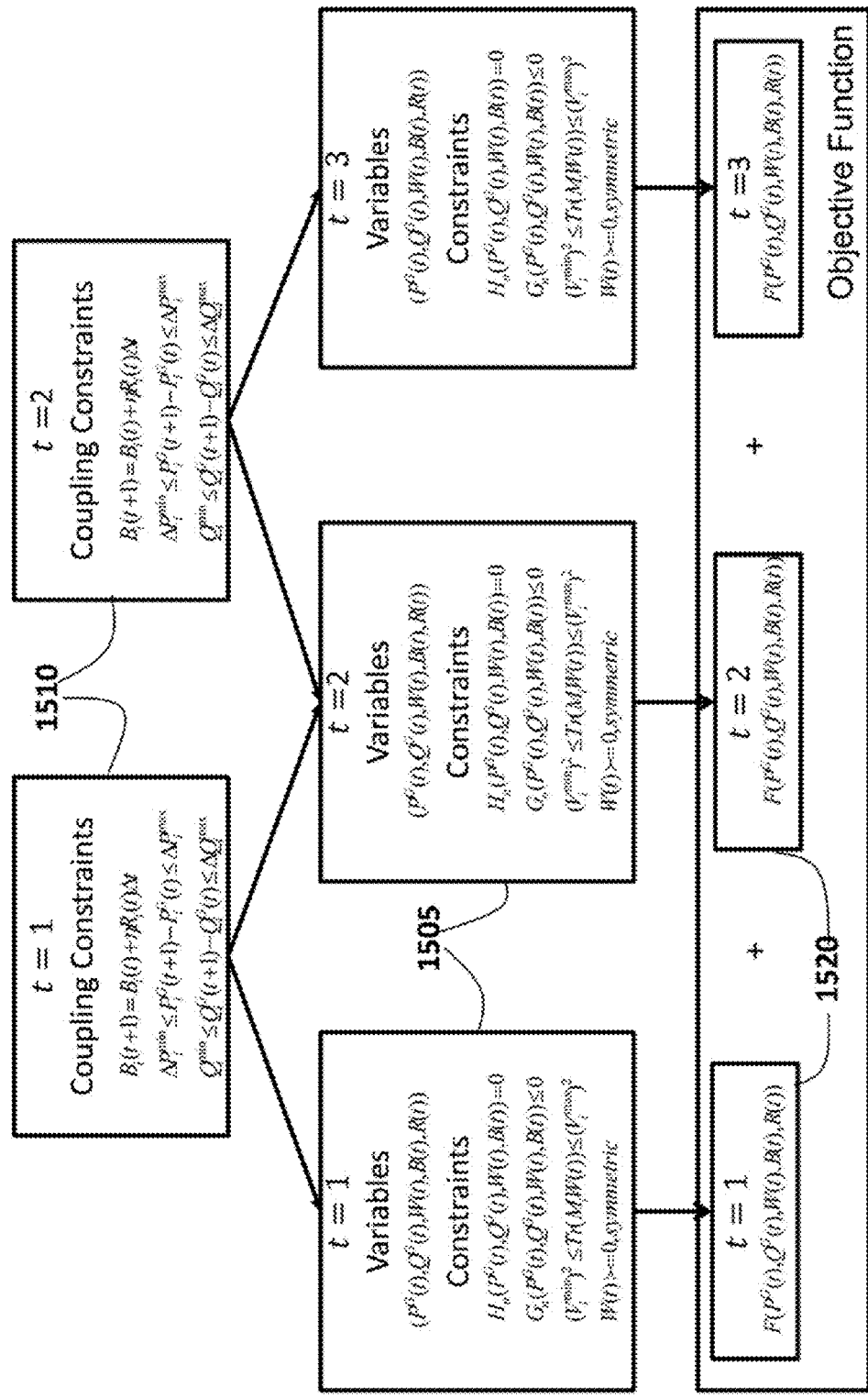
FIG. 15 is a graphical representation of the time coupled problem addressed by one embodiment of the invention.

FIG. 15 shows a graphical representation of the time coupled problem in terms of single time-step constraints 1505, time coupling constraints 1510, single time-step objective function contributions 1520 and the total objective function 1530 obtained by summing over the individual time-step components. In one embodiment, an augmented Lagrangian formulation is used to decompose the Multi-period Optimal Power Flow problem by dualizing only the time coupled constraints in equation (2). The constraints are the dynamics equation for the batteries and the ramp limits for the power generation. The first step in the decomposition is to introduce additional variables and rewriting the time-coupled constraints involving the variables $B_i(t)$, $P_i^G(t)$, $Q_i^G(t)$.

For decoupling the constraint involving $B_i(t)$, introduce $\hat{B}_i(t)$, $\overline{B}_i(t)$ for $t=2, \ldots, T$ and rewrite the battery dynamics constraint on $B_i(t)$ as, $\hat{B}_i(2) = B_i(1) + \eta R_i(1)\Delta t$ $\hat{B}_i(t+1) = B_i(t) + \eta R_i(t)\Delta t, t=2, \ldots, T-1$ $B_i(T+1) = B_i(T) + \eta R_i(t)\Delta t$ $\hat{B}_i(t) = \overline{B}_i(t), t=2, \ldots, T$ $B_i(t) = \overline{B}_i(t), t=2, \ldots, T$ for all $i \in N$ \hfill (3)

Observe that these constraints are identical to those in (2).

For decoupling the constraint involving $P_i^G(t)$, introduce $\hat{P}_i^G(t)$, $\overline{P}_i^G(t)$ for
$t=2, \ldots, T-1$ and rewrite the ramp constraints on $P_i^G(t)$ as, $\Delta P_i^{min} \leq \hat{P}_i^G(t+1) - P_i^G(t) \leq \Delta P_i^{max}, t=1, \ldots, T-1$ $\hat{P}_i^G(t) = \overline{P}_i^G(t), t=2, \ldots, T$ $P_i^G(t) = \overline{P}_i^G(t), t=2, \ldots, T$ for all $i \in N$ \hfill (4)

Observe that these constraints are identical to those in (2).

Figure 16:
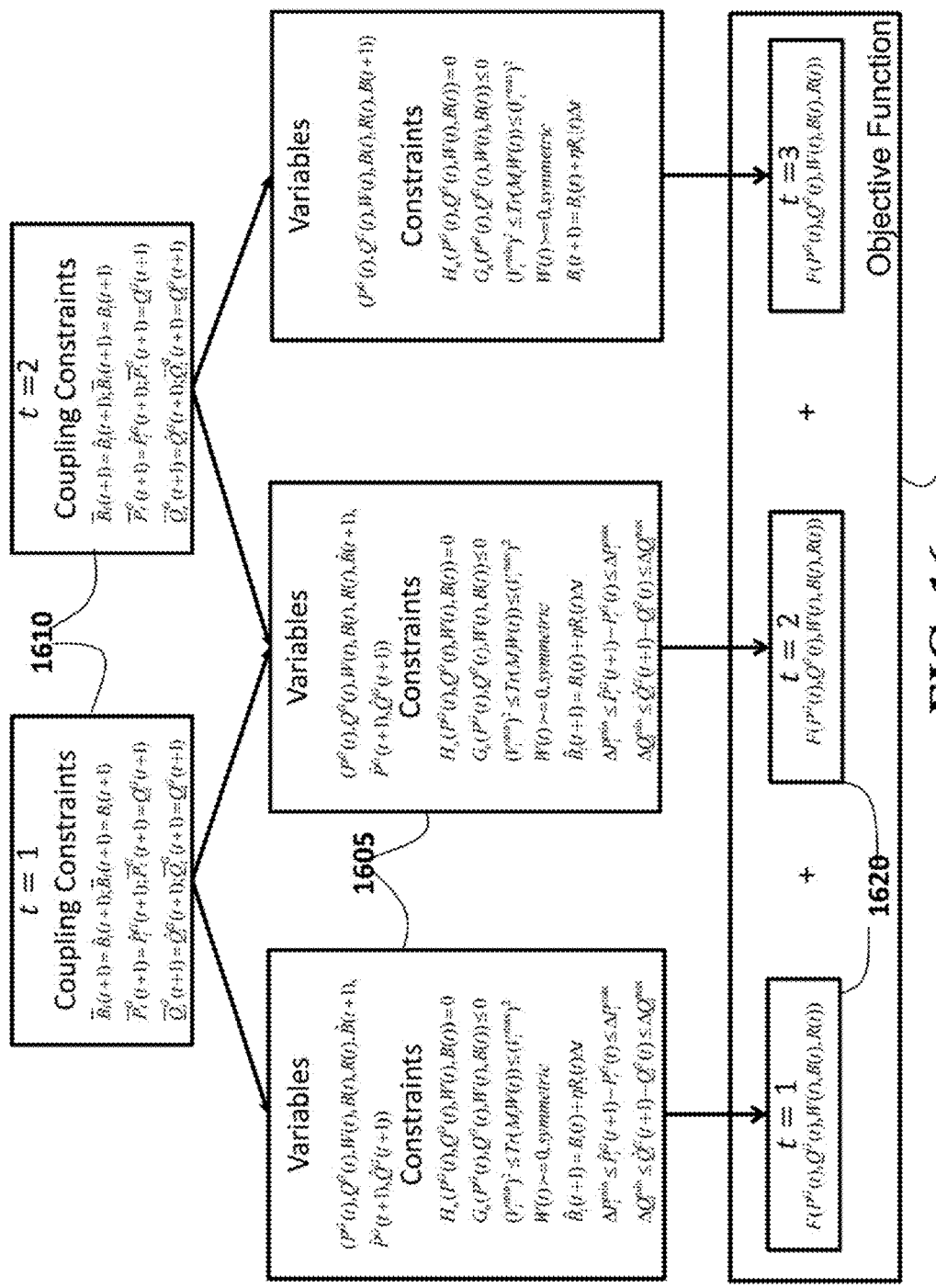
FIG. 16 is a graphical representation of the time coupled problem after the introduction of the additional variables according to one embodiment of the invention.

For decoupling the constraint involving $Q_i^G(t)$, introduce $\hat{Q}_i^G(t)$, $\overline{Q}_i^G(t)$ for $t=2, \ldots, T-1$ and rewrite the ramp constraints on $Q_i^G(t)$ as, $\Delta Q_i^{min} \leq \hat{Q}_i^G(t+1) - Q_i^G(t) \leq \Delta Q_i^{max}, t=1, \ldots, T-1$ $\hat{Q}_i^G(t) = \overline{Q}_i^G(t), t=2, \ldots, T$ $Q_i^G(t) = \overline{Q}_i^G(t), t=2, \ldots, T$ FIG. 16 shows a graphical representation of the time coupled problem after the introduction of the additional variables in terms of single time-step constraints 1605, time coupling constraints 1610, single time-step objective function contributions 1620 and the total objective function 1630 obtained by summing over the individual time-step components.

Figure 17:
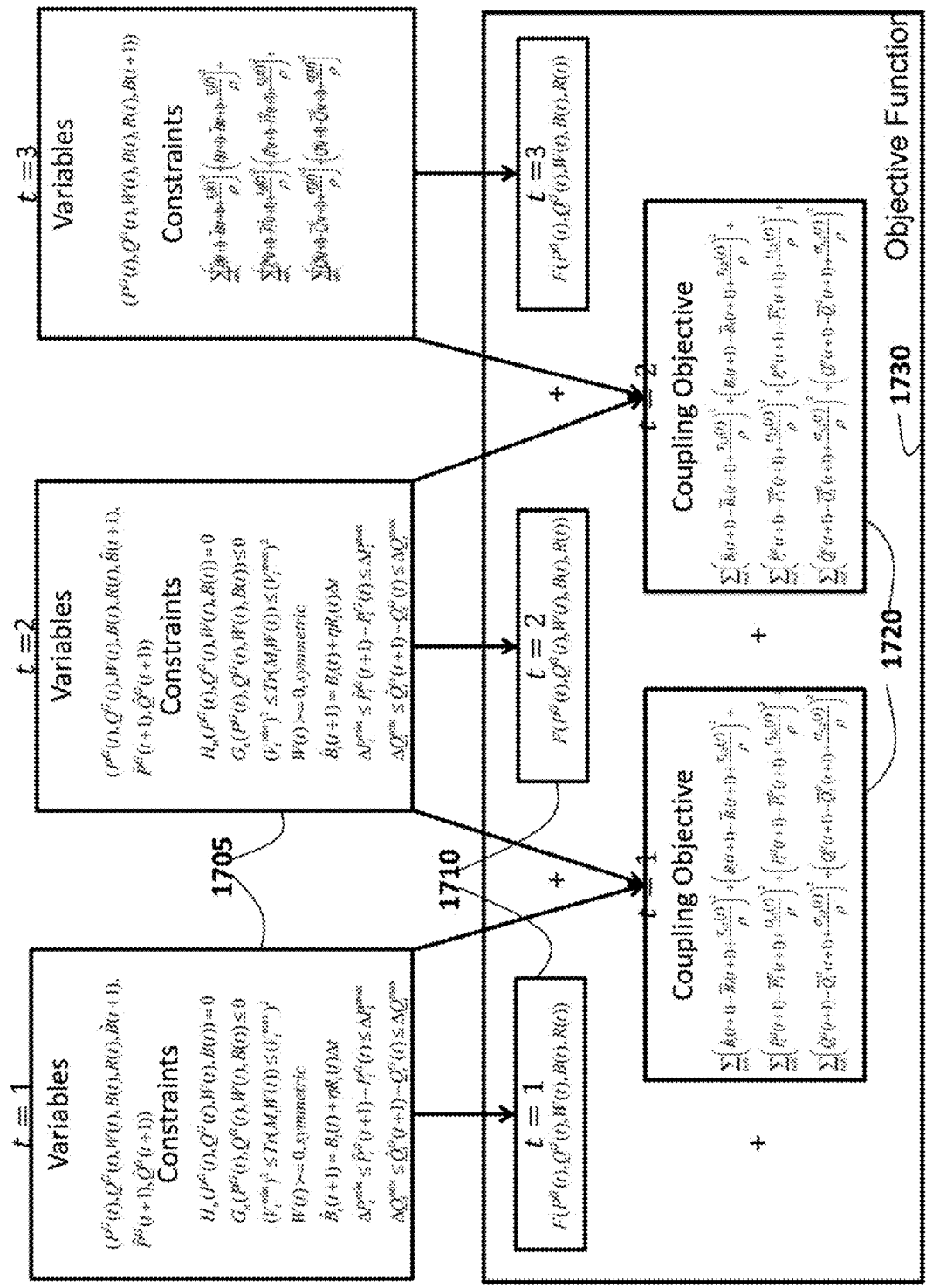
FIG. 17 shows a graphical representation of the dual augmented Lagrangian problem according to one embodiment of the invention.

The second step includes dualizing the constraints involving $\overline{B}_i(t)$, $\overline{P}_i^G(t)$, $\overline{Q}_i^G(t)$ and also including an augmented Lagrangian term in the objective. Prior to this the following notation is introduced for convenience, $\hat{B}(t) = (B_1(t), \ldots, B_{|N|}(t)), \hat{B} = (\hat{B}(2), \ldots, \hat{B}(T))$ $\overline{B}(t) = (\overline{B}_1(t), \ldots, \overline{B}_{|N|}(t)), \overline{B} = (\overline{B}(2), \ldots, \overline{B}(T))$ $\hat{P}^G(t) = (\hat{P}_1^G(t), \ldots, \hat{P}_{|N|}^G(t)), \hat{P}^G = (\hat{P}^G(2), \ldots, \hat{P}^G(T-1))$ $\overline{P}^G(t) = (\overline{P}_1^G(t), \ldots, \overline{P}_{|N|}^G(t)), \overline{P}^G = (\overline{P}^G(2), \ldots, \overline{P}^G(T))$ $\hat{Q}^G(t) = (\hat{Q}_1^G(t), \ldots, \hat{Q}_{|N|}^G(t)), \hat{Q}^G = (\hat{Q}^G(2), \ldots, \hat{Q}^G(T-1))$ $\overline{Q}^G(t) = (\overline{Q}_1^G(t), \ldots, \overline{Q}_{|N|}^G(t)), \overline{Q}^G = (\overline{Q}^G(2), \ldots, \overline{Q}^G(T))$ The dual augmented Lagrangian objective function is:

$$L(P^G, Q^G, W, B, \hat{P}^G, \hat{Q}^G, \hat{B}, \overline{P}^G, \overline{Q}^G, \overline{B}, \tau, \nu, \sigma) = \quad (6)$$

$$\sum_{t=1}^{T}\sum_{i \in N} c_{2i}(P_i^G(t))^2 + c_{1i}P_i^G(t) + c_{0i} +$$

$$\frac{\rho}{2}\sum_{t=2}^{T}\sum_{i \in N}\left(\hat{B}_i(t) - \overline{B}_i(t) + \frac{\tau_{i,1}(t)}{\rho}\right)^2 +$$

$$\frac{\rho}{2}\sum_{t=2}^{T}\sum_{i \in N}\left(B_i(t) - \overline{B}_i(t) + \frac{\tau_{i,2}(t)}{\rho}\right)^2 +$$

$$\frac{\rho}{2}\sum_{t=2}^{T}\sum_{i \in N}\left(\hat{P}_i^G(t) - \overline{P}_i^G(t) + \frac{\nu_{i,1}(t)}{\rho}\right)^2 +$$

$$\frac{\rho}{2}\sum_{t=2}^{T}\sum_{i \in N}\left(P_i^G(t) - \overline{P}_i^G(t) + \frac{\nu_{i,2}(t)}{\rho}\right)^2 +$$

$$\frac{\rho}{2}\sum_{t=2}^{T}\sum_{i \in N}\left(\hat{Q}_i^G(t) - \overline{Q}_i^G(t) + \frac{\sigma_{i,1}(t)}{\rho}\right)^2 +$$

$$\frac{\rho}{2}\sum_{t=2}^{T}\sum_{i \in N}\left(Q_i^G(t) - \overline{Q}_i^G(t) + \frac{\sigma_{i,2}(t)}{\rho}\right)^2$$

where, $\tau_{i,1}(t)$, $\tau_{i,2}(t)$ is the multiplier for the constraints in equation (3) involving $\overline{B}_i(t)$, and $\tau_1(t) = (\tau_{1,1}(t), \ldots, \tau_{|N|,1}(t)), \tau_2(t) = (\tau_{1,2}(t), \ldots, \tau_{|N|,2}(t))$ $\tau_1 = (\tau_1(2), \ldots, \tau_1(T)), \tau_2 = (\tau_2(2), \ldots, \tau_2(T)), \tau = (\tau_1, \tau_2)$, and $\nu_{i,1}(t), \nu_{i,2}(t)$ are the multipliers for the constraints in equation (4) involving $\overline{P}_i^G(t)$, and $\nu_1(t) = (\nu_{1,1}(t), \ldots, \nu_{|N|,1}(t)), \nu_2(t) = (\nu_{1,2}(t), \ldots, \nu_{|N|,2}(t))$ $\nu_1 = (\nu_1(2), \ldots, \nu_1(T)), \nu_2 = (\nu_2(2), \ldots, \nu_2(T)), \nu = (\nu_1, \nu_2)$, and $\sigma_{i,1}(t)$, $\sigma_{i,2}(t)$ are the multipliers the constraints in equation (5) involving $\overline{Q}_i^G(t)$, and $\sigma_1(t) = (\sigma_{1,1}(t), \ldots, \sigma_{|N|,1}(t)), \sigma_2(t) = (\sigma_{1,2}(t), \ldots, \sigma_{|N|,2}(t))$ $\sigma_1 = (\sigma_1(2), \ldots, \sigma_1(T)), \sigma_2 = (\sigma_2(2), \ldots, \sigma_2(T)), \sigma = (\sigma_1, \sigma_2)$, The resulting minimization problem for given values of multipliers $\tau, \nu, \sigma$ is, $$\min_{\substack{P^G, Q^G, W, B \\ \hat{P}^G, \hat{Q}^G, \hat{B}, \overline{P}^G, \overline{Q}^G, \overline{B}}} L(P^G, Q^G, W, B, \hat{P}^G, \hat{Q}^G, \hat{B}, \overline{P}^G, \overline{Q}^G, \overline{B}, \tau, \nu, \sigma) \quad (7)$$

subject to Constraints in (2) other than battery dynamics and ramp limits for generators FIG. 17 shows a graphical representation of the dual augmented Lagrangian problem with coupling in the objective in terms of single time-step constraints 1705, single time-step objective function contributions 1710, time coupling portion of the objective 1720 and the total objective function 1730 obtained by summing over the individual time-step components.

In optimization problem (7) the constraints do not involve coupling between the variables across time steps. The coupling across time-steps still exists in the objective function through the quadratic terms introduced in the augmented Lagrangian formulation, which is resolved using the ADMM.

The ADMM proceeds by:
1) Select values for $\tau^0, v^0, \sigma^0$ and $(\overline{P}^G)^0$, $(\overline{Q}^G)^0$ $(\overline{B})^0$, convergence tolerance $\epsilon > 0$
2) For $l=1, 2, 3, \ldots$ do
   a. Fix, $\tau^l, v^l, \sigma^l$ and $(\overline{P}^G)^l, (\overline{Q}^G)^l, (\overline{B})^l$ and solve for remaining variables $(P^G)^{l+1}, (Q^G)^{l+1}, W^{l+1}, B^{l+1}, \hat{B}^{l+1}$ using (7). With this fixing of certain variables (7) is decoupled by time-step. So the solution of this problem can be performed by solving for each time-step in parallel.
   b. Fixing multipliers, $\tau^l, v^l, \sigma^l$ and $P^{G,l+1}$, $(Q^G)^{l+1}, W^{l+1}$, $B^{l+1}, \hat{B}^{l+1}$ to that obtained from Step a. and solve (7) to obtain the values for $(\overline{P}^G)^{l+1}, (\overline{Q}^G)^{l+1}, (\overline{B})^{l+1}$. Note that this problem is unconstrained since these variables do not appear in the constraints of (7).
   c. Update the multipliers as:

$$\tau_{i,1}^{l+1}(t) = \tau_{i,1}^l(t) + \rho(\hat{B}_i^{l+1}(t) - \overline{B}_i^{l+1}(t)), t=2,\ldots,T$$

$$\tau_{i,2}^{l+1}(t) = \tau_{i,2}^l(t) + \rho(B_i^{l+1}(t) - \overline{B}_i^{l+1}(t)), t=2,\ldots,T$$

$$v_{i,1}^{l+1}(t) = v_{i,1}^l(t) + \rho((\hat{P}^G)_i^{l+1}(t) - (\overline{P}^G)_i^{l+1}(t)), t=2,\ldots,T$$

$$v_{i,2}^{l+1}(t) = v_{i,2}^l(t) + \rho((P^G)_i^{l+1}(t) - (\overline{P}^G)_i^{l+1}(t)), t=2,\ldots,T$$

$$\sigma_{i,1}^{l+1}(t) = \sigma_{i,1}^l(t) + \rho((\hat{Q}^G)_i^{l+1}(t) - (\overline{Q}^G)_i^{l+1}(t)), t=2,\ldots,T$$

$$\sigma_{i,2}^{l+1}(t) = \sigma_{i,2}^l(t) + \rho((Q^G)_i^{l+1}(t) - (\overline{Q}^G)_i^{l+1}(t)), t=2,\ldots,T$$

d. Go to Step 2 if:

$$\left\| \begin{array}{c} \hat{B}^{l+1} - \overline{B}^{l+1} \\ B^{l+1} - \overline{B}^{l+1} \\ (\hat{P}^G)^{l+1} - (\overline{P}^G)^{l+1} \\ (P^G)^{l+1} - (\overline{P}^G)^{l+1} \\ (\hat{Q}^G)^{l+1} - (\overline{Q}^G)^{l+1} \\ (Q^G)^{l+1} - (\overline{Q}^G)^{l+1} \end{array} \right\| > \varepsilon \text{ or } \rho \left\| \begin{array}{c} \tau_1^{l+1} - \tau_1^l \\ \tau_2^{l+1} - \tau_2^l \\ v_1^{l+1} - v_1^l \\ v_2^{l+1} - v_2^l \\ \sigma_1^{l+1} - \sigma_1^l \\ \sigma_2^{l+1} - \sigma_2^l \end{array} \right\| > \varepsilon$$

The steps 2a.-2c. are repeated until convergence criterion in step 2d is satisfied. Step 1 still involves solving a considerably large SDP for a single time-step. The next section shows how this computation can also be made efficient using the ADMM.

ADMM for Single Time-Step Optimal Power Flow

The single time-step problem resulting from time decoupling described in previous section results in the following SDP can be succinctly represented as:

$$\min_{w^q, w^l, W} \frac{1}{2}(w^q)^T H^q w^q + (h^q)^T w^q \quad (8)$$

s.t. $AW + A^q w^q + A^l w^l = b$ $w^{q,lb} \leq w^q \leq w^{q,ub}, w^{l,lb} \leq w^l \leq w^{l,ub}$ $W$ is $2|N| \times 2|N|$ symmetric positive semidefinite where $H^q$ is a positive definite matrix.

FIGS. 18 and 19 provide the exact definition of the variables and the coefficient matrices in the above for time-step $t=1$. Similarly, FIGS. 20 and 21 provide the exact definition of the variables and the coefficient matrices in the above for time-step $t=2 \ldots T-1$. FIGS. 22 and 23 provide the exact definition of the variables and the coefficient matrices for $t=T$. For convenience of providing the definitions, lower and upper bounds are specified for all the variables by introducing additional parameters $P_{ij,(i,j) \in E}^{min}$, $P_{ji,(i,j) \in E}^{min}$, $Q_{ij,(i,j) \in E}^{min}$, $Q_{ji,(i,j) \in E}^{min}$ and $P_{ij,(i,j) \in E}^{max}$, $P_{ji,(i,j) \in E}^{max}$, $Q_{ij,(i,j) \in E}^{max}$, $Q_{ji,(i,j) \in E}^{max}$ to denote the minimum and maximum limits on the active and reactive power flows.

The size of the semidefinite matrix W is twice the number of nodes in the electrical network and the size of the constraints is on the order of the number of nodes and edges in the power grid. This can be computationally expensive for large grids when using interior point algorithms. To alleviate the computational burden, the ADMM method is considered to solve the SDP.

In the preferred embodiment the ADMM method can be applied directly to the formulation in (8). The augmented lagrangian formulation is, $$\max_{\substack{w^q, w^l, W \\ x^q, x^l, X}} f^{AugLag}(w^l, w^q, W, x^l, x^q, X, z^l, z^q, Z) \quad (9)$$

s.t. $AW + A^q w^q + A^l w^l = b$ $w^{q,lb} \leq w^q \leq w^{q,ub}, w^{l,lb} \leq w^l \leq w^{l,ub}$ $X$ is $2|N| \times 2|N|$ symmetric positive semidefinite where $$f^{AugLag}(w^l, w^q, W, x^l, x^q, X, z^l, z^q, Z) := \frac{1}{2}(w^q)^T H^q w^q + (h^q)^T w^q +$$

$$\frac{\alpha}{2}\left\| w^l - x^l + \frac{z^l}{\alpha} \right\|^2 + \frac{\alpha}{2}\left\| w^q - x^q + \frac{z^q}{\alpha} \right\|^2 + \frac{\alpha}{2}\left\| W - X + \frac{Z}{\alpha} \right\|_F^2$$

where $\alpha > 0$ is a scalar parameter, $z^l$ are multipliers for equality constraints $w^l = x^l$, $z^q$ are multipliers for equality constraints $w^q = x^q$, Z is the multiplier matrix for the equality constraints $W = Z$. In the above, $\|\cdot\|$ is the vector 2-norm and $\|\cdot\|_F$ is the Frobenius norm for matrices.

The steps of the ADMM algorithm applied to the formulation in (9) are:

1) Select $(x^l)^0, (x^q)^0, X^0, (z^l)^0, (z^q)^0, Z^0$, convergence tolerance $\varepsilon > 0$.

2) For $k = 1, 2, \ldots$ a. Solve for $(w^l)^{k+1}, (w^q)^{k+1}, W^{k+1}$ from:

$((w^l)^{k+1}, (w^q)^{k+1}, W^{k+1}) :=$ $\underset{w^l, w^q, W}{\operatorname{argmin}} f^{AugLagDual}(w^l, w^q, W, (x^l)^k, (x^q)^k, (X)^k, (z^l)^k, (z^q)^k, Z^k)$ s.t. $AW + A^q w^q + A^l w^l = b$ b. Solve for $(x^l)^{k+1}, (x^q)^{k+1}, X^{k+1}$ from:

$((x^l)^{k+1}, (x^q)^{k+1}, X^{k+1}) :=$ $\underset{x^l, x^q, X}{\operatorname{argmin}} f^{AugLagDual}((w^l)^{k+1}, (w^q)^{k+1}, W^{k+1}, x^l, x^q, X, (z^l)^k, (z^q)^k, Z^k)$ s.t. $w^{q,lb} \leq x^q \leq w^{q,ub}, w^{l,lb} \leq x^l \leq w^{l,ub}$ -continued c. Solve for $(z^l)^{k+1}$, $(z^q)^{k+1}$, $Z^{k+1}$ from:

X symmetric positive semidefinite $(z^l)^{k+1} = (z^l)^k + \alpha((w^l)^{k+1} - (x^l)^{k+1})$ $(z^q)^{k+1} = (z^q)^k + \alpha((w^q)^{k+1} - (x^q)^{k+1})$ $Z^{k+1} = Z^k + \alpha((W)^{k+1} - (X)^{k+1})$ d. Go to Step 2 if:

$$\left\| \begin{matrix} (w^l)^{k+1} - (x^l)^k \\ (w^q)^{k+1} - (x^q)^k \\ W^{k+1} - X^k \end{matrix} \right\| > \varepsilon \text{ or } \alpha \left\| \begin{matrix} (z^l)^{k+1} - (z^l)^k \\ (z^q)^{k+1} - (z^q)^k \\ Z^{k+1} - Z^k \end{matrix} \right\| > \varepsilon$$

The solution of the optimization problem in Step 2a. can be computationally expensive in general but in the context of optimal power flow problems the number of generators in the power grid is typically small. Hence, the computational cost of this step can be reduced considerably and this realization is the key to solving (9) efficiently. A significant advantage of using the ADMM algorithm is that if a good initial guess is available for the problem (8) then the algorithm converges quickly. Such a behavior cannot be expected for interior point algorithms for semidefinite programs. This property is commonly called as warm-starting and is important especially when semidefinite programs are to be solved as part of a branch and bound algorithm as described earlier. The warm-starting property of the ADMM allows to improve the overall computational efficiency of the branch-and-bound process.

In another embodiment, the standard lagrangian dual of the semidefinite program in (8) can be constructed and the ADMM algorithm can be applied to the resulting dual.

Chordal Graphs and Maximal Clique Decomposition

The set of edges includes edges from a node to itself, that is $(i,i) \subset E \forall i \in N$. The electrical networks do not contain such self loops and have been included only for presentation. A graph G(N,E) is said to be a clique if the graph has all possible edges between the nodes in the graph. Further, a graph G(N, E) is said to be chordal if for every cycle in the graph with four or more nodes there exists an edge between two non-adjacent vertices in the cycle.

Figure 24C:
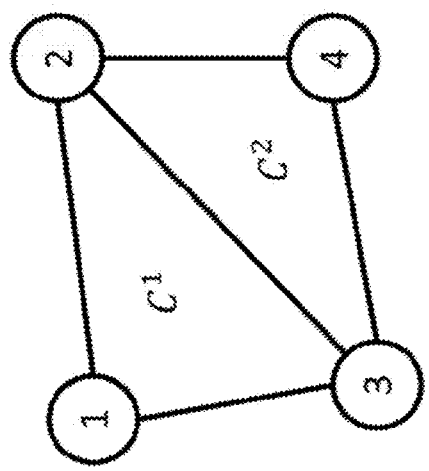
FIGS. 24A, 24B and 24C are examples of non-chordal graphs used by various embodiments of the invention.
Figure 24B:
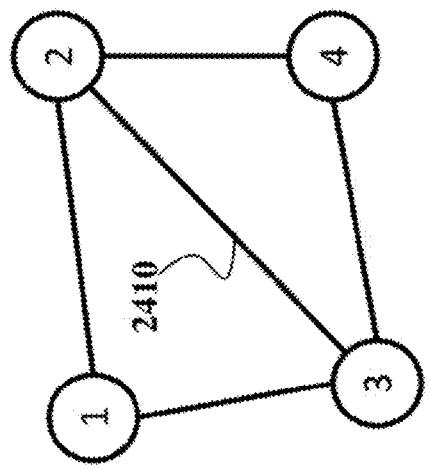
Figure 24A:
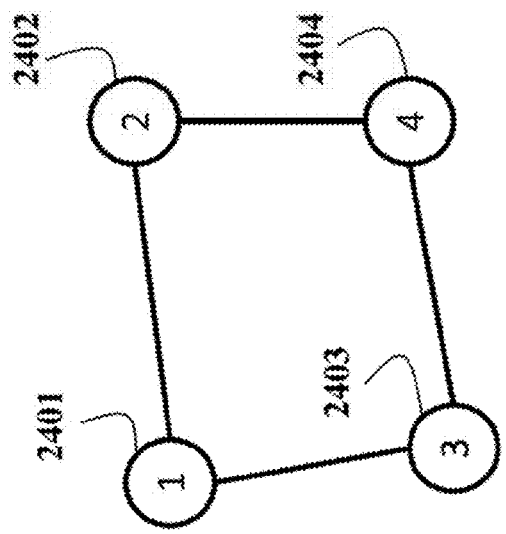

FIG. 24A shows an example of non-chordal graph that includes a cycle with four nodes 2401, 2402, 2403 and 2404 and adjacent edges are not connected. FIG. 24B shows a chordal graph that is obtained from the graph in FIG. 24A by adding the edge (2,3) 2410. The graph of FIG. 24B is called the chordal extension of the graph in FIG. 24A. Formally, the chordal extension of a graph G(N,E) is the graph G(N,E∪E') where E' are additional edges that are added to the original set of edges in E to render the resulting graph chordal. Given a graph G(N,E) and a set N'⊆N then the subgraph induced by N' is the graph G(N',E') with edges E'={(i,j)|i,j∈N',(i,j)∈E}.

Given a graph that is not chordal, the following algorithm describes how to obtain a graph with additional edges so that the resulting graph is chordal. Such a graph is also called the chordal extension of a graph. The chordal extension of a graph can be obtained by following algorithm:

Input: Graph G(N, E)
Output: Ordering of vertices order(i) and additional set of edges E'
Create the adjacency list Adj(i) = {j|(i,j) ∈ E} for each node i ∈ N.
Assign to each node a label label(i) = |Adj(i)| for each node i ∈ N where |Adj(i)| denotes the degree of node.
Set the ordering for each node order(i) = 0 for each node i ∈ N.

-continued

Set N' = N,E' = ∅,n = 1.
While n ≤ |N| do
    Pick node i ∈ N' such that label(i) is the smallest
    Set order(i) = n,n = n + 1,N' = N'\{i}
    If subgraph induced by Adj(i) is not a clique
        Identify additional set of edges E(i) =
{(i',j') ∉ E|i',j' ∈ Adj(i)} so that Adj(i) is a clique.
        Update Adj(j) for j ∈ Adj(i) based on the additional edges
        in E(i)
        Set E' = E' ∪ E(i)
        Set label(j) = |Adj(j)| for all j ∈ Adj(i)
    End If
End While It is a well known result in graph theory that every chordal graph can be decomposed a set of maximal cliques where maximality is defined by the non-existence of another clique in the given graph that strictly contains it. That is, given a chordal graph G(N,E) there exists $C^1, \ldots, C^l$ where $C^r \subset N \forall r=1, \ldots, l$, $N = C^1 \cup \ldots \cup C^l$ and $C^r \times C^r \subseteq E$. The maximal cliques of a graph can be obtained as follows:

Input: Chordal graph G(N, E ∪ E') Ordering of vertices order(i)
Output: Maximal cliques $C^1, \ldots, C^l$
Set l = 1
For each node i node sorted in ascending order of order(i) do
    Set C = {i} ∪ {Adj(i) ∩ {j|order(j) > order(i)}}
    If l == 1 then
        Set $C^l$ = C,l = l + 1
    Else
        If C ⊄ $C^k \forall$ k = 1, ... ,l - 1 then
            Set $C^l$ = C,l = l + 1
        End If
    End If
End For FIG. 24C numbers the two maximal cliques present in the graph in FIG. 24B.

Exploiting Structure in the Solution of the Single Time-Step Optimal Power Flow

The computationally demanding task in the ADMM algorithm presented for (9) is the eigenvalue decomposition that is involved in the solution of the optimization problem for $X^{k+1}$ in Step 2b. To address this computational bottleneck the graph of the electrical network can be exploited. The graph G(N,E) induced by the typical electrical network is sparse in the sense that there does not exist an electrical line between every pair of buses in the network. This sparsity can be exploited to decompose the positive semidefinite constraint in (9) which is on a matrix of size 2|N|×2|N| into a number of positive semidefinite constraint of smaller sized matrices. This also allows the eigenvalue step computation to be parallelized and allows speeding up of the algorithm. The process of decomposition is described below.

Given, the graph of the electrical network G(N,E), let $C^1, \ldots, C^l$ denote a maximal clique decomposition satisfying $C^r \subset N \forall r=1, \ldots, l$, $N = C^1 \cup \ldots \cup C^l$ and $C^r \times C^r \subseteq E$. Using this maximal clique decomposition the single-time step optimal power flow problem in (8) can be written as:

$$\min_{w^q,w^l,W} \frac{1}{2}(w^q)^T H^q w^q + (h^q)^T w^q \qquad (10)$$

$$\text{s.t. } AW + A^q w^q + A^l w^l = b$$

$$w^{q,lb} \leq w^q \leq w^{q,ub}, w^{l,lb} \leq w^l \leq w^{l,ub}$$

-continued $W$ is $2|C^r| \times 2|C^r|$ symmetric positive semidefinite $$(W^r)_{ij} = W_{i'j'} \text{ where } i' = \begin{cases} C^r(i) \text{ if } i \leq |N| \\ |N| + C^r(i) \text{ if } i > |N| \end{cases};$$

$$j' = \begin{cases} C^r(j) \text{ if } j \leq |N| \\ |N| + C^r(j) \text{ if } j > |N| \end{cases}$$

The positive semidefinite constraint is posed on a number of smaller sized matrices as opposed to the large matrix as in (8). Further, since matrix A only has nonzero entries for $(i,j) \in E$ we can eliminate the variables W to obtain a semidefinite program only the variables $\{W^r\}_{r=1}^l, w^q, w^l$ which will be similar to the problem in (8) and the ADMM algorithm described previously can be applied.

In another embodiment the standard lagrangian dual of the semidefinite program in (10) can be constructed and the ADMM algorithm described earlier can be applied to the dual instead of (10).

Upper Bound—Based Sufficient Condition

The upper bound based sufficient condition is used to verify if the obtained solution is a globally optimal solution. This is possible in the case of MOPF since it is an instance of a quadratically constrained quadratic program. Suppose the optimization problem (1) is solved using a nonlinear programming solver. Let $P^{G,*}(t), Q^{G,*}(t), V^*(t), B^*(t))_{i=1,\ldots,T}$ be the solution obtained and let $(\lambda_n^{e,*}(t))_{n=1,\ldots,Ne,t=1,\ldots,T}$, $(\lambda_n^{i,*}(t))_{n=1,\ldots,Ni,i=1,\ldots,T}$ be the multipliers for the equality $h_n$ and inequality constraints $g_n$ respectively. The sufficient condition can be stated as follows.

The solution to the upper bounding problem is also a globally optimal solution if the matrix defined by the hessian of the lagrangian defined in (11) is positive semidefinite. In other words, this amount to checking if $$\sum_{t=1}^{T} \begin{pmatrix} \nabla^2 f(P^{G,*}(t), Q^{G,*}(t), V^*(t), B^*(t)) + \\ \sum_{n=1}^{Ne} \lambda_n^{e,*}(t) \nabla^2 h_n(P^{G,*}(t), Q^{G,*}(t), V^*(t), B^*(t)) + + \\ \sum_{n=1}^{Ne} \lambda_n^{i,*}(t) \nabla^2 g_n(P^{G,*}(t), Q^{G,*}(t), V^*(t), B^*(t)) \end{pmatrix} \quad (11)$$

is positive semidefinite where, $\nabla^2 f, \nabla^2 h_n, \nabla^2 g_n$ denote the hessian of the functions $f, h_n, g_n$. This check involves simply performing an eigenvalue decomposition and can be accomplished with much fewer computations than solving an SDP problem $$\text{minimize} \sum_{t=1}^{T} f(P^G(t), Q^G(t), V(T), B(T))$$

subject to $h_n(P^G(t), Q^G(t), V(t), B(T)) = 0 \forall n = 1, \ldots, Ne, t = 1, \ldots, T$ $g_n(P^G(t), Q^G(t), V(t), B(T)) \leq 0 \forall n = 1, \ldots, Ni, t = 1, \ldots, T$ Lower Bound—Based Sufficient Condition The sufficient condition for the lower bound to be a globally optimal solution is to simply check if in the solution to (2), the matrices W(t) have rank less than or equal to 2. This again is a simple check that can be performed quickly. If the rank some of the matrices W(t) are 1, in other words, $W(t) = \omega_1(t) w_1(t) w_1(t)^T$ where $\omega_1(t), w_1(t)$ is the nonzero eigenvalue and its eigenvector respectively. Then, solution to the upper ounding problem can be obtained as, $V(t) = \sqrt{\omega_1(t)} w_1(t)$. If the rank of some of the matrices W(t) are 2, in other words, $W(t) = \omega_1(t) w_1(t) w_1(t)^T + \omega_2(t) w_2(t) w_2(t)^T$ where $\omega_1(t), \omega_2(t)$ are the two non-zero eigenvalues and $w_1(t), w_2(t)$ are its corresponding eigenvectors. Then, the solution to the upper bounding problem can be obtained as $V(t) = (\sqrt{\omega_1(t)} + \sqrt{\omega_2(t)}) w_1(t)$.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining a power flow of a power grid, comprising:
   optimizing, using a processor, an objective function representing an operation of the power grid using a spatial branch and bound (BB) framework for determining iteratively upper and lower bounds of the objective function, wherein the lower bounds are determined using a semi-definite programming (SDP) relaxation of an optimal power flow (OPF) problem.

2. The method of claim 1, wherein the optimizing comprises:
   partitioning iteratively a feasible region of the OPF problem into a nested tree of regions corresponding to a BB tree, wherein the nested tree of regions includes a first region and a second region nested in the first region; and
   determining the upper and the lower bounds of the objective function in at least some regions including the first and the second regions, wherein a solution of the OPF problem corresponding to the lower bound of the first region is an input to the SDP relaxation for determining the lower bound of the second region.

3. The method of claim 2, further comprising:
   updating a lowest upper bound of the BB tree with an upper bound of the second region, if the upper bound is less than the lowest upper bound of the BB tree;
   updating a lowest lower bound of the BB tree with a lower bound of the region, if the lower bound is greater than the lowest lower bound of the BB tree and lower than the lower bounds of other regions of the nested tree; and
   determining the power flow based on the lowest upper bound of the BB tree if a difference between the lowest upper bound and the lowest lower bound of the BB tree is less than a threshold.

4. The method of claim 3, further comprising:
   updating the lowest lower bound of the BB tree with the lowest lower bound of other regions, if the lower bound of the region is greater than the lowest lower bound of the BB tree and greater than the lowest lower bound of the other regions.

5. The method of claim 3, wherein the upper bound solution for each node of the BB tree is checked for a satisfaction of a sufficient condition for global optimality before the lower bound problem is solved.

6. The method of claim 3, wherein the lower bound solution for each node of the BB tree is checked for a satisfaction of a sufficient condition for global optimality and if globally optimal, is used to construct an upper bound solution.

7. The method of claim 2, wherein the splitting is based on structure of elements of the power grid.

8. The method of claim 2, wherein the SDP relaxation uses an alternating direction method of multipliers (ADMM) method.

9. The method of claim 8, further comprising:
decomposing semi-definite constraints in the SDP into semi-definite constraints on smaller blocks comprising maximal clique subgraphs of the graph based on an electrical network.

10. The method of claim 1, wherein the power grid includes at least one storage system, the objective function represents the operation of the power grid over time, and wherein the OPF is a multi-period optimal power flow (MOPF) problem.

11. The method of claim 10, further comprising:
decoupling time-coupling constraints by dualization with an augmented Lagrangian formulation;
solving SDP problems corresponding to individual time-steps; and
applying an alternating direction method of multipliers (ADMM) method to converge the time-decoupled constraints.

12. The method of claim 11, wherein the solving the SDP problem for each time-step comprises:
performing a clique decomposition of a graph associated with the power grid; and
applying the ADMM to the augmented Lagrangian formulation of the dual problem.

13. A method for solving an optimal power flow (OPF) problem optimizing an objective function representing an operation of a power grid, comprising:
partitioning iteratively a feasible region of the OPF problem into a nested tree of regions corresponding to a branch and bound (BB) tree, wherein the nested tree of regions includes at least a first region and a second region nested in the first region;
determining an upper bound of the OPF problem in the second region;
determining a lower bound of the OPF problem in the second region using a semi-definite programming (SDP) relaxation of the OPF problem, wherein a solution of the OPF problem corresponding to a lower bound of the first region is an input to the SDP relaxation;
updating a lowest upper bound of the BB tree with the upper bound of the second region, if the upper bound of the second region is less than the lowest upper bound of the BB tree;
updating a lowest lower bound of the BB tree with the lower bound of the second region, if the lower bound of the second region is greater than the lowest lower bound of the BB tree and the lower bound of the second region is lower than lowest lower bound of other regions of the nested tree;
updating the lowest lower bound of the BB tree with the lowest lower bound of other regions, if the lower bound of the second region is greater than the lowest lower bound of the BB tree and the lower bound of the second region is greater than the lowest lower bound of the other regions; and
determining the optimal power flow based on the lowest upper bound of the second region if a difference between the lowest upper bound and the lowest lower bound of the second region is less than a threshold, wherein steps of the method are performed by a processor.

14. A system for solving an optimal power flow (OPF) problem optimizing an objective function representing an operation of a power grid, comprising a processor for optimizing an objective function representing an operation of the power grid using a spatial branch and bound (BB) framework for determining iteratively upper and lower bounds of the objective function, wherein the lower bounds are determined using a semi-definite programming (SDP) relaxation of an optimal power flow (OPF) problem, wherein a solution of the OPF problem corresponding to a lower bound of a first region is an input to the SDP relaxation for a second region.

* * * * *